(12) United States Patent
Ito

(10) Patent No.: US 12,099,254 B2
(45) Date of Patent: Sep. 24, 2024

(54) LENS BARREL AND CAMERA EQUIPPED WITH SAME

(71) Applicant: Panasonic Intellectual Property Management Co., Ltd., Osaka (JP)

(72) Inventor: Daisuke Ito, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 526 days.

(21) Appl. No.: 17/491,675

(22) Filed: Oct. 1, 2021

(65) Prior Publication Data

US 2022/0291477 A1 Sep. 15, 2022

(30) Foreign Application Priority Data

Mar. 12, 2021 (JP) ................................. 2021-039852

(51) Int. Cl.
*G02B 7/10* (2021.01)
*G02B 7/02* (2021.01)

(52) U.S. Cl.
CPC ............... *G02B 7/10* (2013.01); *G02B 7/021* (2013.01)

(58) Field of Classification Search
CPC ............. G02B 7/10; G02B 7/021; G02B 7/08
(Continued)

(56) References Cited

U.S. PATENT DOCUMENTS 6,115,190 A * 9/2000 Hirai ........................ G02B 7/10
359/823
10,018,801 B2 7/2018 Matsumoto
(Continued)

FOREIGN PATENT DOCUMENTS

JP S61-171016 U 10/1986
JP 2004-258638 A 9/2004
(Continued)

OTHER PUBLICATIONS

Office Action issued in corresponding Japanese application No. 2021-039852 dated Apr. 2, 2024.

*Primary Examiner* — William R Alexander
(74) *Attorney, Agent, or Firm* — Renner, Otto, Boisselle & Sklar, LLP

(57) ABSTRACT

It is an object of the present disclosure to provide a lens barrel with which looseness caused by a gap formed between a fixed barrel and a cam barrel can be effectively suppressed without increasing the rotational torque of the cam barrel, as well as a camera equipped with this lens barrel. A lens barrel 100 comprises first to seventh lens group units 21 to 27, a substantially cylindrical rectilinear barrel 11, a substantially cylindrical cam barrel 12, and spacers 11ga, 11gb, 11ha, 11hb, 11ia and 11ib. The cam barrel 12 moves the third to seventh lens group units 23 to 27 in the optical axis OP direction by being rotated with respect to the rectilinear barrel 11 in a state in which main cam followers 11b and main cam grooves 12b are engaged with each other. The spacers 11ga, 11gb, 11ha, 11hb, 11ia and 11ib protrude in the radial direction from the rectilinear barrel 11 and come into contact with the cam barrel 12 so as to suppress looseness between the rectilinear barrel 11 and the cam barrel 12, and the length in the optical axis OP direction is equal to or greater than the amount of movement of the cam barrel 12 in the optical axis OP direction with respect to the rectilinear barrel 11.

14 Claims, 21 Drawing Sheets

(58) Field of Classification Search
USPC .......................................................... 359/823
See application file for complete search history.

(56) References Cited

U.S. PATENT DOCUMENTS

| | | | |
|---|---|---|---|
| 11,366,281 B2 | 6/2022 | Ito | |
| 2003/0072089 A1* | 4/2003 | Yasutomi | ............... G02B 7/102 |
| | | | 359/701 |
| 2016/0018621 A1 | 1/2016 | Matsumoto | |
| 2016/0202448 A1* | 7/2016 | Okada | ................... G02B 7/102 |
| | | | 359/701 |
| 2020/0264400 A1 | 8/2020 | Ito | |

FOREIGN PATENT DOCUMENTS

| | | | |
|---|---|---|---|
| JP | 2005-274704 A | 10/2005 |
| JP | 2010-008745 A | 1/2010 |
| JP | 2015-040971 A | 3/2015 |
| JP | 2020-134654 A | 8/2020 |
| WO | 2014/136162 A1 | 9/2014 |

\* cited by examiner

LENS BARREL AND CAMERA EQUIPPED WITH SAME

CROSS-REFERENCE TO RELATED APPLICATIONS

This application claims priority to Japanese Patent Application No. 2021-039852 filed on Mar. 12, 2021. The entire disclosure of Japanese Patent Application No. 2021-039852 is hereby incorporated herein by reference.

BACKGROUND

Technical Field

The present disclosure relates to a lens barrel mounted on a camera body, and to a camera equipped with this lens barrel.

Description of the Related Art

A lens barrel mounted on a camera body comprises a plurality of frames that support an optical system. The first frame body included in this plurality of frame bodies has a cam member, and the second frame body has a guide groove in which the cam member is inserted and slides.

When the first and second frames rotate relative to each other, the cam member is guided by the guide groove, and as the frames move relative to each other in the optical axis direction, the result is a retractable lens barrel.

For example, Patent Literature 1 discloses a lens barrel comprising a fixed barrel having a guide groove, a cam barrel that is disposed rotatably with respect to the fixed barrel and has a cam groove having a tapered portion, and a moving lens holding member that holds a moving lens and that movably holds a cam follower that moves along the guide groove, wherein the cam follower has a tapered contact portion that can come into contact with the tapered portion of the cam groove, and is biased outward in the radial direction by a cam follower biasing member.

CITATION LIST

Patent Literature

Patent Literature 1: International Laid-Open Patent Application No. 2014/136162
Patent Literature 2: JP 2005-274704
Patent Literature 3: JP 2015-040971

SUMMARY

However, the following problems are encountered with the conventional lens barrel described above.

Specifically, with the lens barrel disclosed in the above publication, the cam follower is outward in the radial direction to reduce the risk that the cam follower will come out of the cam groove, or that the cam follower or the cam groove will be deformed, if the lens barrel should be subjected to an impact force. However, with a configuration such as this, the cam follower is pressed against the tapered portion of the cam groove by the biasing force of a spring or the like, so a problem is that rotational torque tends to be high, among other problems.

In particular, with a configuration in which a plurality of lens groups are driven in the optical axis direction, the lens frames that hold the lens groups driven by the rotation of the cam barrel will be heavy, so problems such as rotational torque are more likely to occur.

It is an object of the present disclosure to provide a lens barrel with which looseness caused by a gap formed between a fixed barrel and a cam barrel can be effectively suppressed without increasing the rotational torque of the cam barrel, as well as a camera equipped with this lens barrel The lens barrel according to the present disclosure includes one or more lens groups, a substantially cylindrical fixed barrel, a substantially cylindrical cam barrel, and a spacer. The substantially cylindrical fixed barrel holds the lens group on the inner peripheral surface side and has a cam follower that protrudes in the radial direction. The substantially cylindrical cam barrel is disposed substantially coaxially with the fixed barrel, has a cam groove that is formed in a direction intersecting the optical axis direction and engages with the cam barrel cam follower in order to move the lens group in the optical axis direction, and moves the lens groups in the optical axis direction by being rotated relative to the fixed barrel in a state in which the cam barrel cam follower and the cam groove are engaged with each other. The spacer protrudes in the radial direction from the fixed barrel and comes into contact with the cam barrel so as to suppress looseness in the radial direction between the fixed barrel and the cam barrel, the length of the spacer in the optical axis direction being equal to or greater than the amount of movement of the cam barrel in the optical axis direction with respect to the fixed barrel.

Effects

With the lens barrel according to the present disclosure, it is possible to effectively suppress looseness caused by a gap formed between the fixed barrel and the cam barrel, without increasing the rotational torque of the cam barrel.

DETAILED DESCRIPTION OF THE PREFERRED EMBODIMENTS

Embodiments of the present disclosure will now be described through reference to the drawings. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The applicant has provided the appended drawings and the following description so that a person skilled in the art might fully understand this disclosure, but does not intend for these to limit what is discussed in the patent claims.

Embodiment 1

A lens barrel 100 according to the embodiment of the present disclosure, and a camera 1 equipped with the lens barrel 100, will now be described with reference to FIGS. 1 to 15B.

(1) Configuration of Lens Barrel 100

Figure 1:
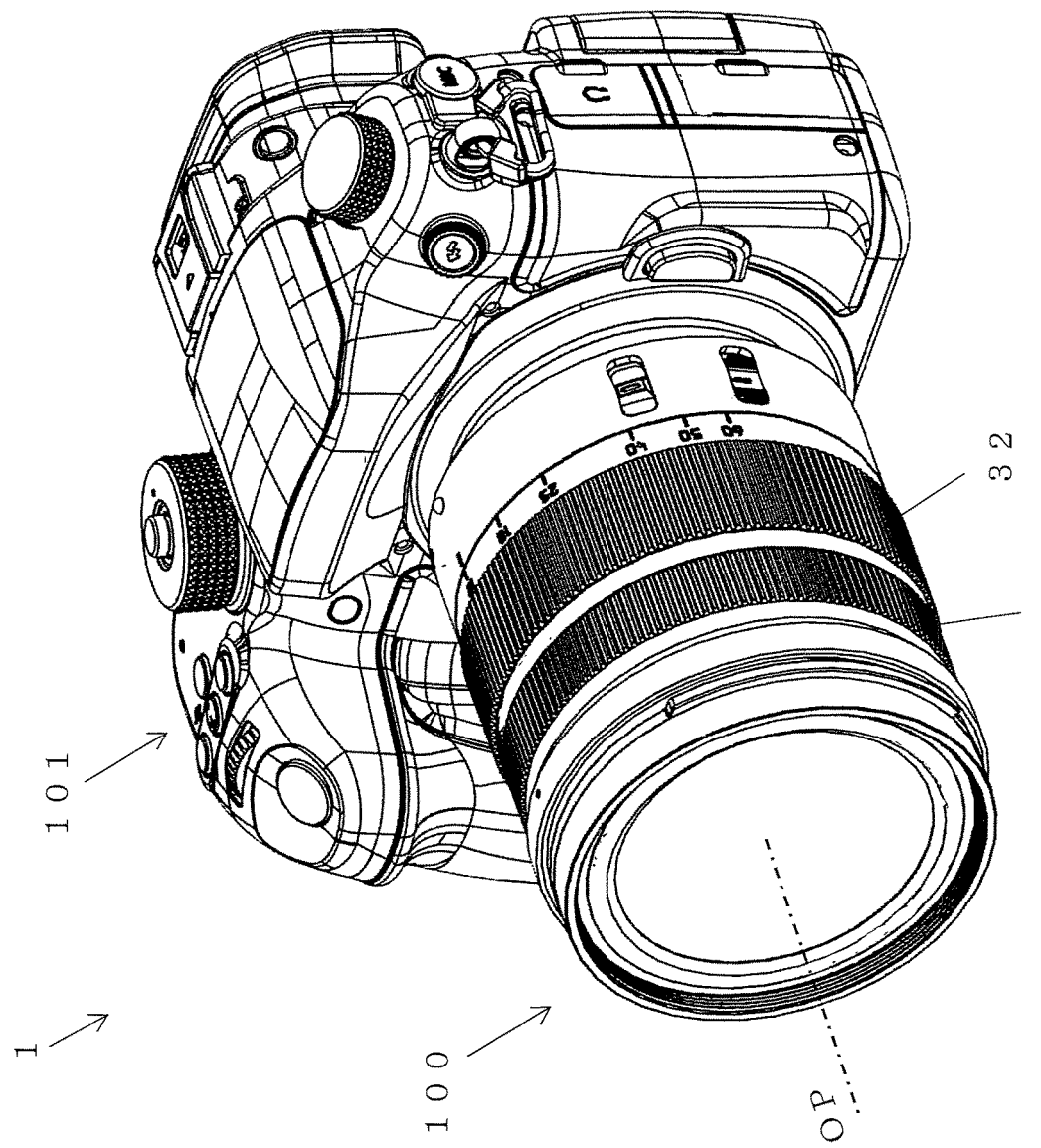
FIG. 1 is an overall oblique view showing the configuration of a camera in which the lens barrel according to an embodiment of the present disclosure is mounted on a camera body.

The configuration of the lens barrel 100 according to an embodiment of the present disclosure will now be described with reference to the drawings. FIG. 1 is an oblique view showing the camera 1 in which the lens barrel 100 according to this embodiment is mounted on a camera body 101.

As shown in FIG. 1, the lens barrel 100 is a retractable lens barrel that is removably attached to the camera body 101.

Figure 2:
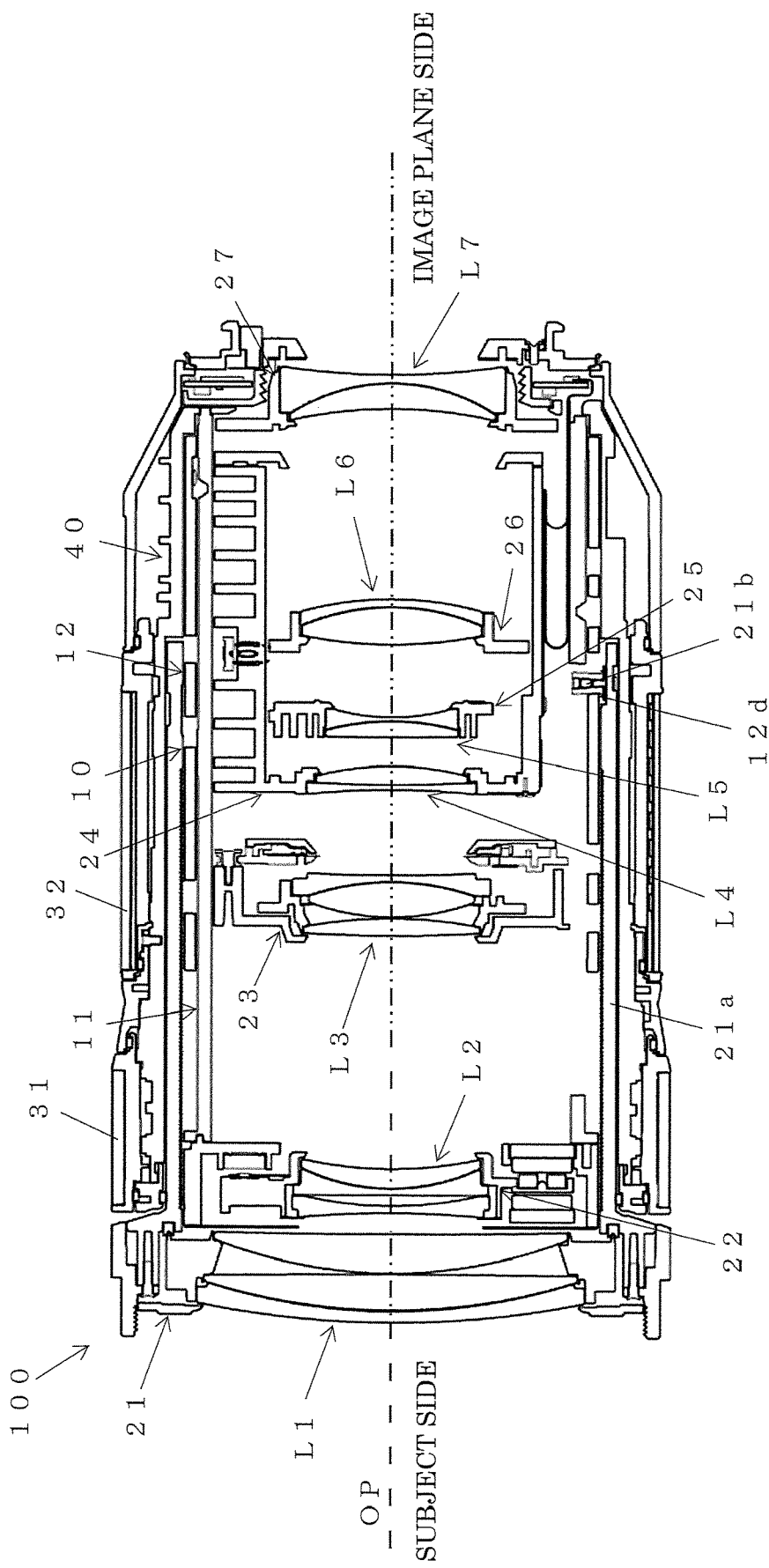
FIG. 2 is a cross-sectional view of the lens barrel in FIG. 1.
Figure 3A:
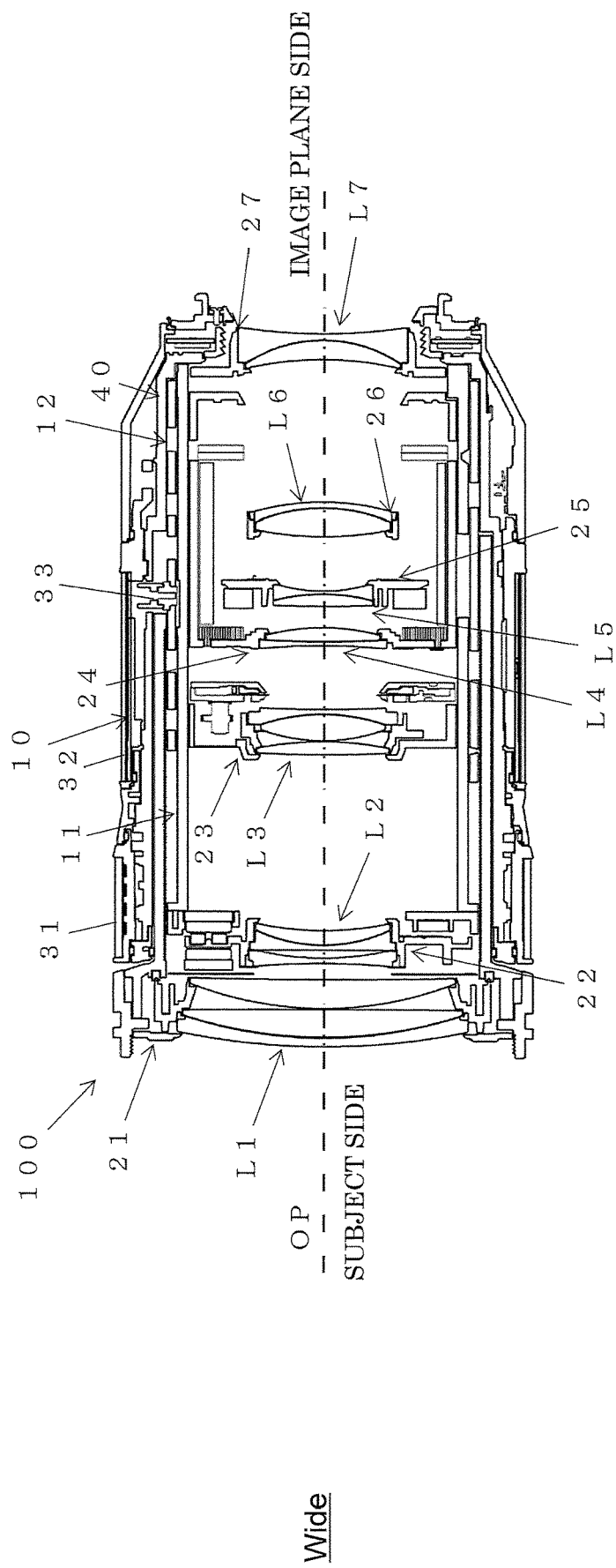
FIG. 3A is a cross-sectional view showing a state in which the lens barrel in FIG. 2 is in the wide-angle position.
Figure 3B:
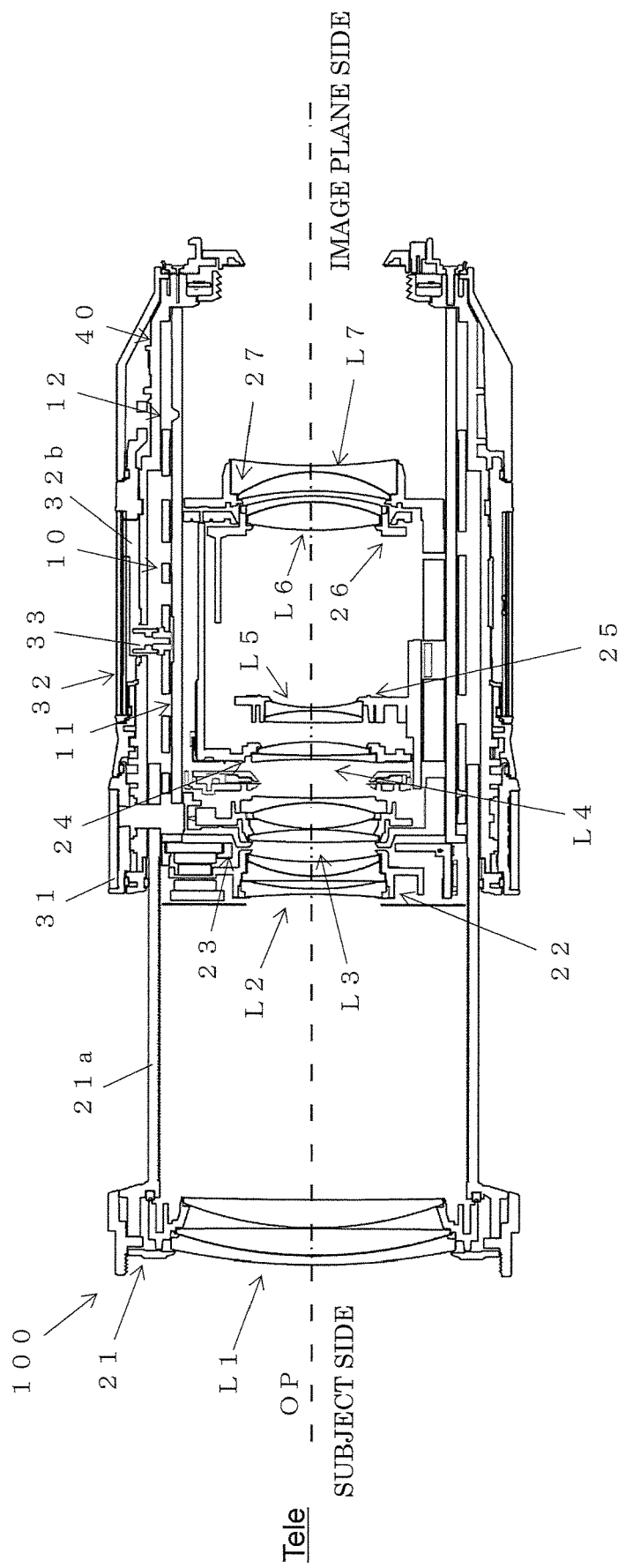
FIG. 3B is a cross-sectional view showing a state in which the lens barrel in FIG. 2 is in the telephoto position.

As shown in FIG. 2, the lens barrel 100 mainly comprises a rectilinear barrel (fixed barrel) 11, a cam barrel 12, a first lens group unit 21, a second lens group unit 22, a third lens group unit 23, a fourth lens group unit 24, a fifth lens group unit 25, a sixth lens group unit 26, a seventh lens group unit 27, a focus ring 31, a zoom ring 32, and a base frame 40.

The lens barrel 100 also comprises a lens support mechanism 10 that includes the rectilinear barrel 11 and the cam barrel 12. The detailed configuration of the lens support mechanism 10 will be described in detail below.

The first lens group unit 21 is a substantially cylindrical member disposed on the outer peripheral surface side of the rectilinear barrel 11, and holds a first lens group L1 at the end on the subject side in the optical axis OP direction, as shown in FIG. 2. The first lens group unit 21 is disposed closest to the subject in the optical axis OP direction of the lens barrel 100.

As shown in FIG. 2, the first lens group unit 21 has a substantially cylindrical main body portion 21a and a cam follower 21b that is provided on the inner peripheral surface of the substantially cylindrical main body portion 21a.

The cam follower 21b of the first lens group unit 21 is provided so as to protrude inward in the radial direction from the outer peripheral surface, near the end portion on the subject side of the inner peripheral surface of the substantially cylindrical main body portion 21a. The cam follower 21b is engaged with a rectilinear groove 11d (see FIG. 5) formed in the rectilinear barrel 11 and a cam groove 12d (see FIG. 6A) formed in the cam barrel 12, and moves the first lens group unit 21 back and forth in the optical axis OP direction along with the rotation of the cam barrel 12.

The second lens group unit 22 is a substantially annular member included on the inner peripheral surface side of the rectilinear barrel 11, and holds a second group lens L2 as shown in FIG. 2. The second lens group unit 22 is disposed between the first lens group unit 21 and the third lens group unit 23 in the optical axis OP direction of the lens barrel 100. The second lens group unit 22 is fixed with screws (not shown) to the end surface on the subject side of the rectilinear barrel 11.

The third lens group unit 23 is a substantially annular member included on the inner peripheral surface side of the rectilinear barrel 11, and holds the third lens group L3 as shown in FIG. 2. The third lens group unit 23 is disposed between the second lens group unit 22 and the fourth lens group unit 24 in the optical axis OP direction of the lens barrel 100.

The third lens group unit 23 has a cam follower 23a (see FIG. 4A) provided so as to protrude outward in the radial direction from the outer peripheral surface.

The fourth lens group unit 24 is a substantially cylindrical member included on the inner peripheral surface side of the rectilinear barrel 11, and holds the fourth lens group L4 as shown in FIG. 2. The fourth lens group unit 24 is disposed between the third lens group unit 23 and the fifth lens group unit 25 in the optical axis OP direction of the lens barrel 100.

The fourth lens group unit 24 has a cam follower 24a (see FIG. 4A) provided so as to protrude outward in the radial direction from the outer peripheral surface.

The fifth lens group unit 25 is a substantially annular member included on the inner peripheral surface side of the rectilinear barrel 11, and holds the fifth lens group lens L5 as shown in FIG. 2. The fifth lens group unit 25 is disposed between the fourth lens group unit 24 and the sixth lens group unit 26 in the optical axis OP direction of the lens barrel 100. The fifth lens group unit 25 is attached in a state of being suspended from the fourth lens group unit 24 by a guide shaft 28 (see FIG. 11) that is attached at one end to the fourth lens group unit 24.

The sixth lens group unit 26 is a substantially annular member included on the inner peripheral surface side of the rectilinear barrel 11, and holds the sixth lens group L6 as shown in FIG. 2. The sixth lens group unit 26 is disposed between the fifth lens group unit 25 and the seventh lens group unit 27 in the optical axis OP direction of the lens barrel 100. Like the fifth lens group unit 25, the sixth lens group unit 26 is attached in a state of being suspended from the fourth lens group unit 24 by a guide shaft (not shown).

The seventh lens group unit 27 is a substantially annular member included on the inner peripheral surface side of the rectilinear barrel 11, and holds the seventh lens group L7 as shown in FIG. 2. The seventh lens group unit 27 is disposed closest to the image plane side (the opposite side from the subject side) in the optical axis OP direction of the lens barrel 100.

The seventh lens group unit 27 has a cam follower 27a (see FIG. 4A) provided so as to protrude outward in the radial direction from the outer peripheral surface.

Here, the first to seventh lens groups L1 to L7 held by the first to seventh lens group units 21 to 27 are disposed in that order starting from the subject side, with the optical axis OP as the center axis. With the lens barrel 100, when the zoom ring 32 (discussed below) is rotated, this moves the first and third to seventh lens group units 21 and 23 to 27 back and forth in the optical axis OP direction between the wide-angle position shown in FIG. 3A and the telephoto position shown in FIG. 3B.

That is, the lens barrel 100 is configured so that upon rotation of the zoom ring 32 attached in a rotatable state to the outer peripheral surface of the base frame 40, the cam barrel 12 rotates along with the zoom ring 32. With the lens barrel 100, when the cam barrel 12 rotates, the first and third to seventh lens group units 21 and 23 to 27 are driven back and forth in the optical axis OP direction.

Figure 4A:
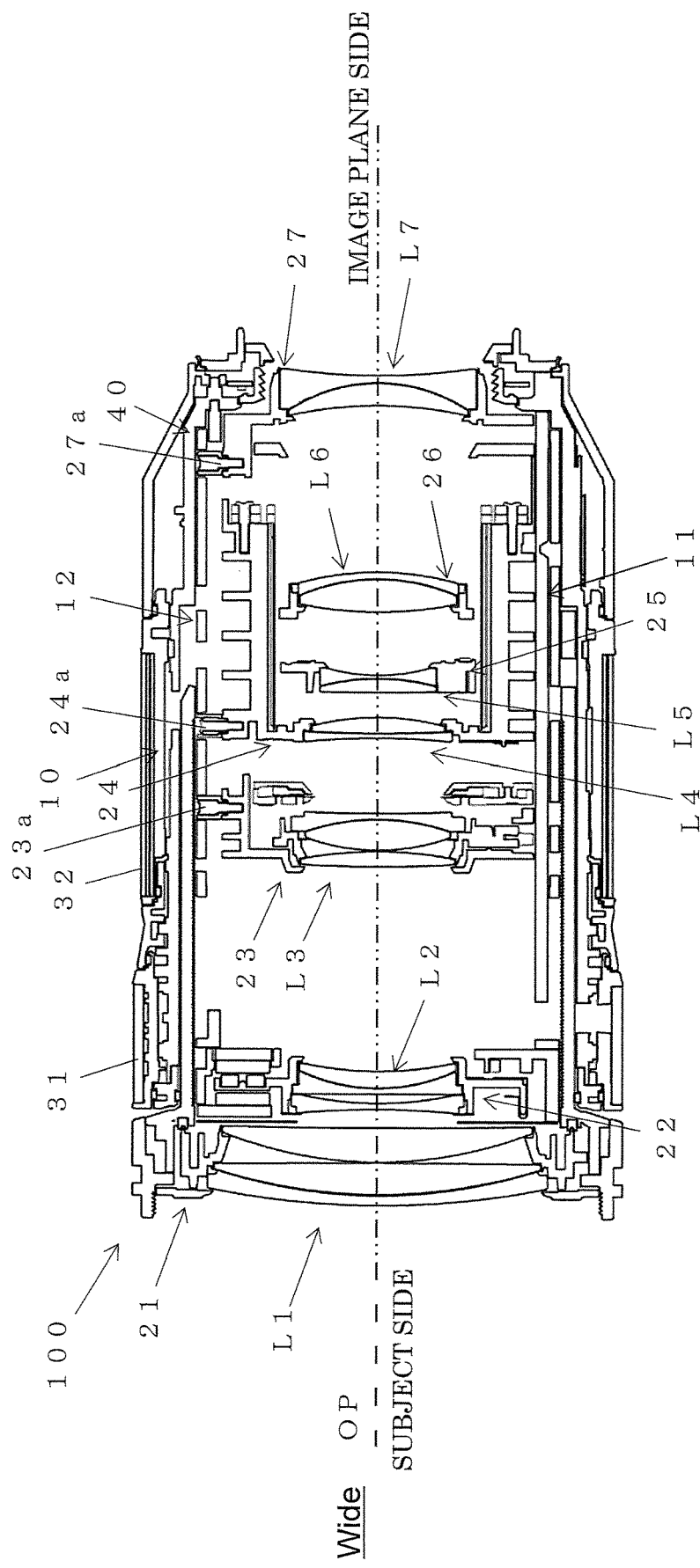
FIG. 4A is a cross-sectional view showing a state in which the cam followers of the third, fourth, and seventh lens group units are engaged with the cam groove of the cam barrel in the wide-angle position in FIG. 3A.

As shown in FIG. 4A, the first, third, fourth, and seventh lens group units 21, 23, 24, and 27 have a plurality of cam followers (21b, 23a, 24a, and 27a) that are engaged with a plurality of cam grooves formed in the cam barrel 12. Also, the cam follower 21b of the first lens group unit 21 engages with the rectilinear groove 11d formed in the rectilinear barrel 11. Also, the cam followers 23a, 24a, and 27a of the third, fourth, and seventh lens group units 23, 24, and 27 engage with a rectilinear groove 11e formed in the rectilinear barrel 11.

Furthermore, the cam follower 21b of the first lens group unit 21 engages with the cam groove 12d formed in the cam barrel 12. Also, the cam followers 23a, 24a, and 27a of the third, fourth, and seventh lens group units 23, 24, and 27 engage with the cam grooves 12e, 12f, and 12g formed in the cam barrel 12.

Figure 4B:
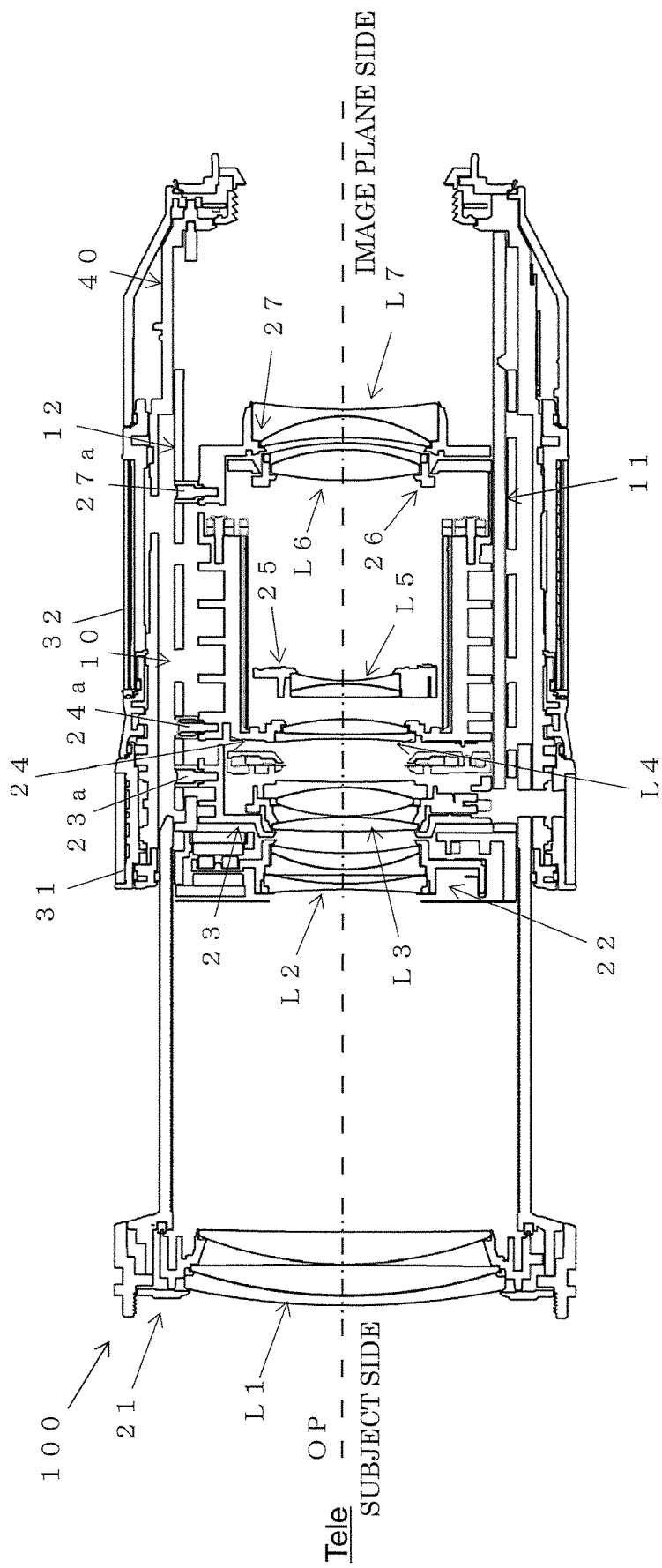
FIG. 4B is a cross-sectional view showing a state in which the cam followers of the third, fourth, and seventh lens group units are engaged with the cam groove of the cam barrel in the telephoto position in FIG. 3B.

Consequently, when the cam barrel 12 is rotated with respect to the rectilinear barrel 11, the first, third, fourth, and seventh lens group units 21, 23, 24, and 27 are driven back and forth relatively in the optical axis OP direction between the wide-angle position shown in FIG. 4A and the telephoto position shown in FIG. 4B.

(2) Configuration of Lens Support Mechanism 10

The configuration of the lens support mechanism 10 in this embodiment will now be described in detail.

As shown in FIG. 2, etc., the lens support mechanism 10 comprises a rectilinear barrel 11 and a cam barrel 12.

(2-1) Rectilinear Barrel 11

Figure 5:
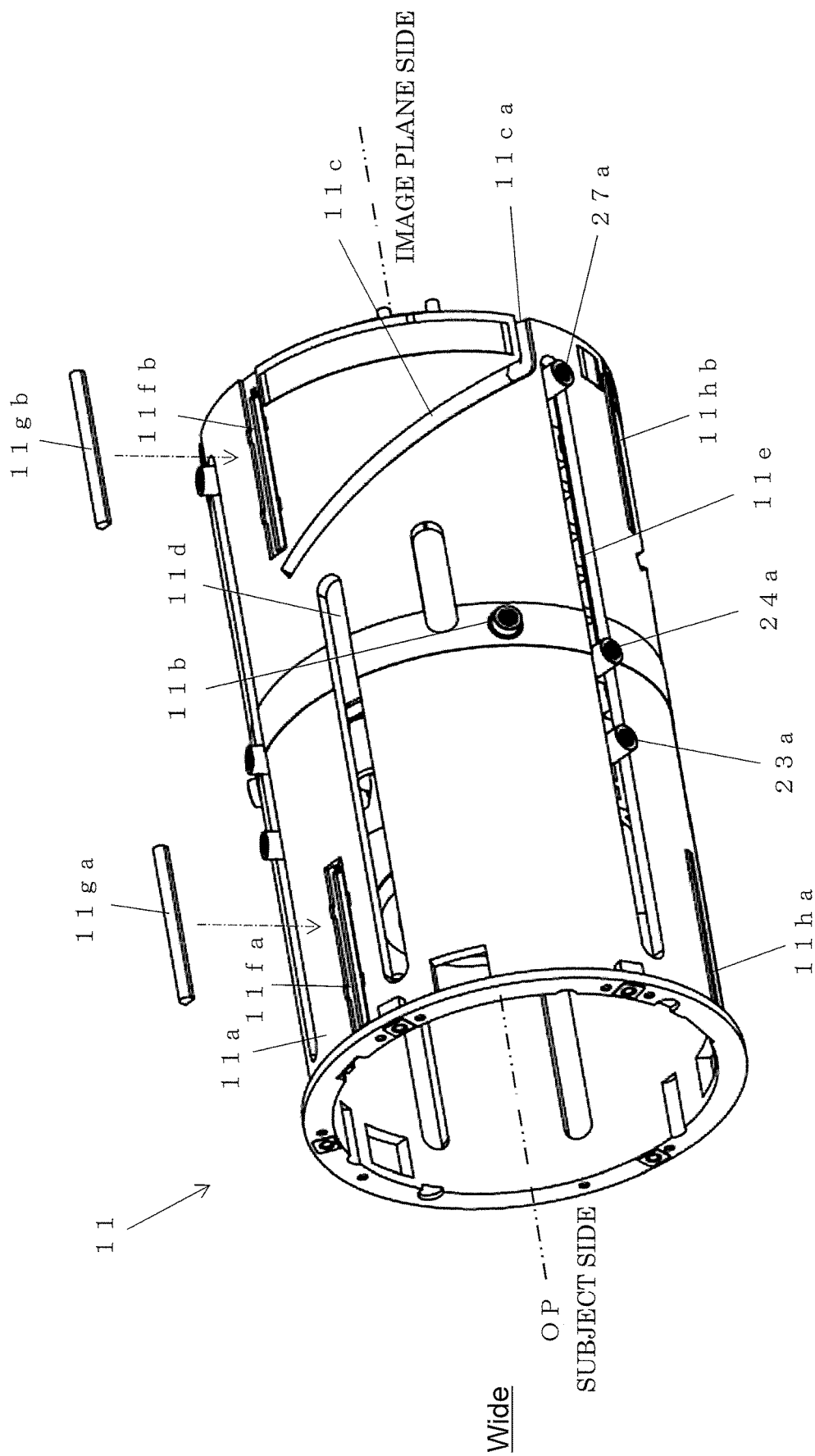
FIG. 5 is an oblique view showing a spacer removably attached to the outer peripheral surface of the rectilinear barrel included in the lens barrel in FIG. 2.

As shown in FIG. 5, the rectilinear barrel 11 has a substantially cylindrical main body portion 11a, main cam followers 11b, a sub-cam groove 11c, rectilinear grooves 11d and 11e, recesses 11fa and 11fb, a spacer 11ga (first spacer, removable spacer) and a spacer 11gb (second spacer, removable spacer), a spacer 11ha (first spacer, fixed spacer) and a spacer 11hb (second spacer, fixed spacer), and a spacer 11ia (first spacer, fixed spacer) and a spacer 11ib (second spacer, fixed spacer). FIG. 5 shows the positions of the cam followers 23a, 24a, and 27a in the wide-angle position shown in FIG. 3A, etc.

As shown in FIG. 5, the rectilinear groove 11d that engages with the cam follower 21b provided to the first lens group unit 21, and the rectilinear groove 11e that engages with the cam followers 23a, 24a, and 27a provided to the third, fourth, and seventh lens group units 23, 24, and 27 are formed in the substantially cylindrical main body portion 11a. Three main cam followers 11b are attached around the circumferential direction near the approximate center of the outer peripheral surface of the main body portion 11a.

As shown in FIG. 5, the three main cam followers (first cam followers) 11b are attached so as to protrude from the outer peripheral surface of the substantially cylindrical main body portion 11a.

For the convenience of illustration, the main cam followers 11b are directly attached to the outer peripheral surface of the rectilinear barrel 11 in FIG. 5, but in the actual process of assembling the lens barrel 100, the main cam followers 11b are attached to the outer peripheral surface of the rectilinear barrel 11 in a state in which the cam barrel 12 has been inserted on the outer peripheral surface side of the rectilinear barrel 11.

Figure 6A:
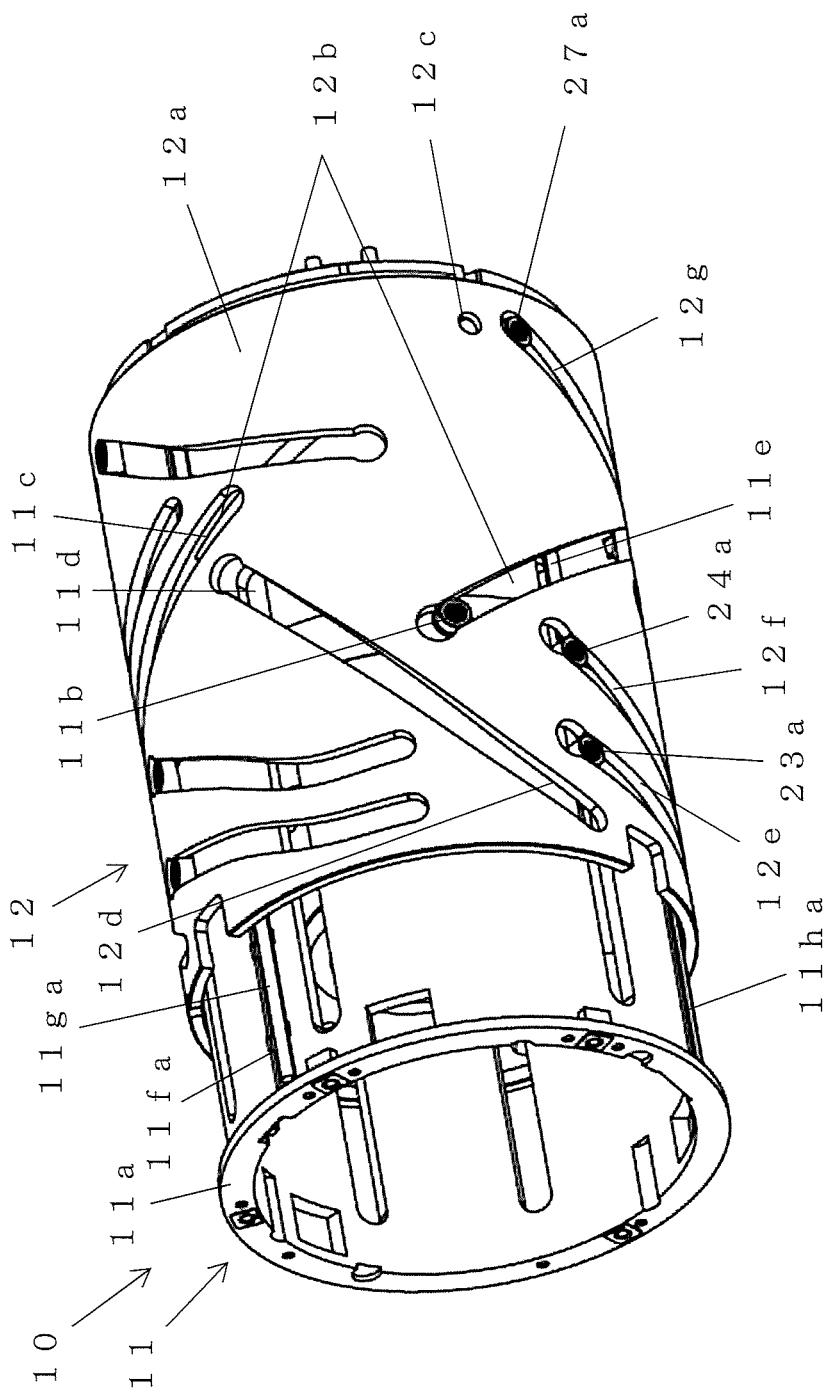
FIG. 6A is an oblique view showing the positional relationship between the rectilinear barrel in FIG. 5, the cam barrel disposed on the outer peripheral surface side thereof, and the cam followers of the lens group units, in the wide-angle position.
Figure 6B:
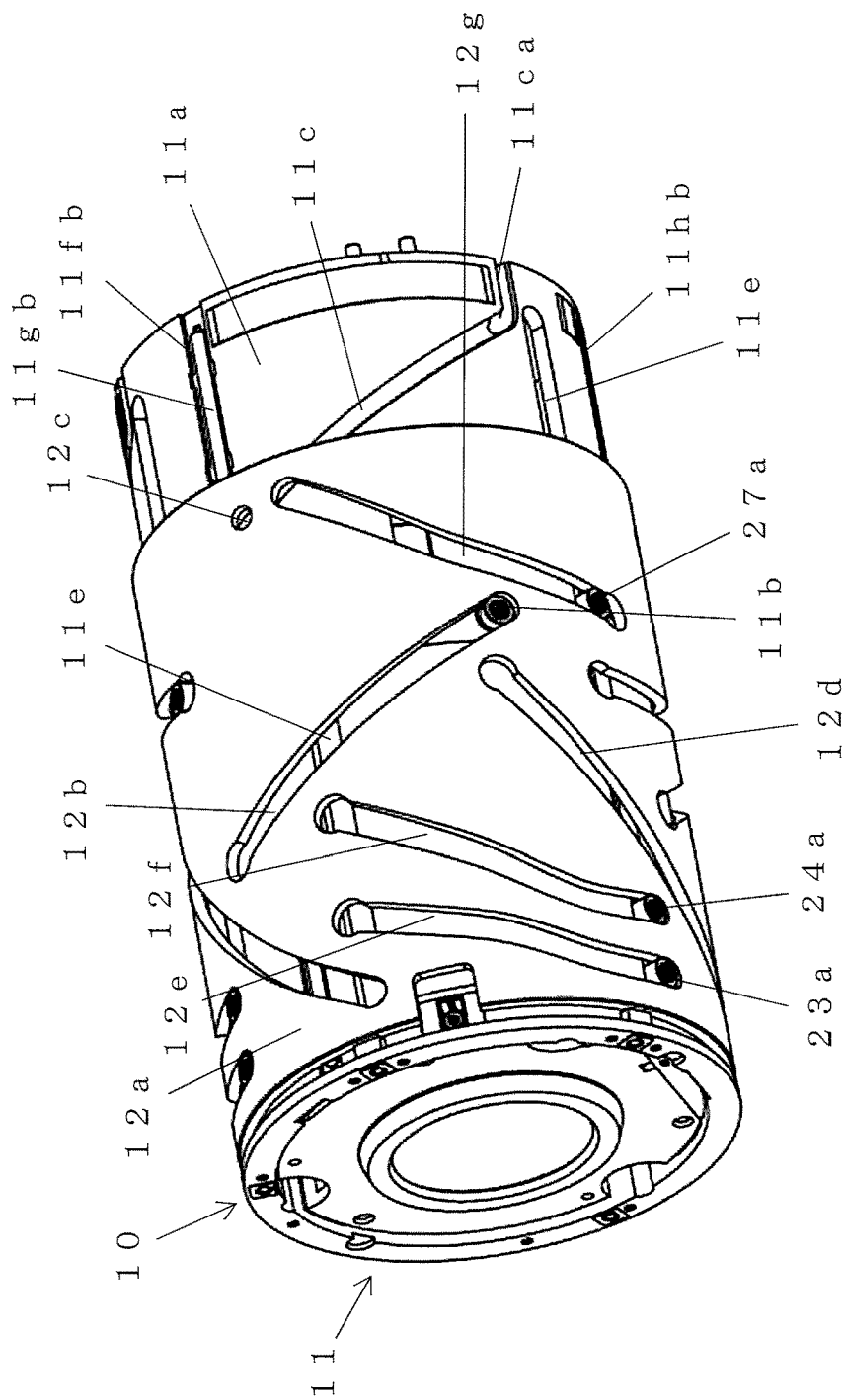
FIG. 6B is an oblique view showing the positional relationship between the rectilinear barrel in FIG. 5, the cam barrel disposed on the outer peripheral surface side thereof, and the cam followers of the lens group units, in the telephoto position.

As shown in FIGS. 6A and 6B, the main cam followers 11b engage with main cam grooves 12b formed on the cam barrel 12 side, and move along the main cam grooves 12b as the cam barrel 12 rotates.

As shown in FIG. 5, the sub-cam groove 11c is a recess formed at an angle to the optical axis OP direction, and engages, via a specific gap, with the sub-cam follower 12c, which is provided so as to protrude inward in the radial direction from the inner peripheral surface of the main body portion 12a of the cam barrel 12. As shown in FIGS. 6A and 6B, the sub-cam groove 11c is formed so as to be substantially parallel to the main cam grooves 12b provided on the cam barrel 12 side (discussed below).

Also, an insertion port 11ca is provided to the sub-cam groove 11c, on the end on the image plane side.

Consequently, during assembly of the lens barrel 100, the cam barrel 12 is inserted from the image plane side of the rectilinear barrel 11 while the sub-cam follower 12c is still attached to the inner peripheral surface side of the main body portion 12a of the cam barrel 12, allowing the sub-cam follower 12c to engage with the sub-cam groove 11c.

The rectilinear groove 11d is a through-hole in which the first lens group unit 21 is moved in the optical axis OP direction, and is formed in a straight line along the optical axis OP direction at a position closer to the subject side in the optical axis OP direction as shown in FIG. 5.

The rectilinear groove 11e is a through-hole in which the third, fourth, and seventh lens group units 23, 24, and 27 are moved in the optical axis OP direction, and as shown in FIG. 5, the cam followers 23a, 24a, and 27a of the units 23, 24, and 27 are engaged in this groove. The rectilinear groove 11e is formed in a straightly line along the optical axis OP direction over substantially the entire length of the substantially cylindrical main body portion 11a in the optical axis OP direction.

As shown in FIG. 5, the recesses 11fa and 11fb are recessed portions formed in the outer peripheral surface of the main body portion 11a of the rectilinear barrel 11, to which the spacers 11ga and 11gb are attached. As shown in FIG. 5, the recesses 11fa and 11fb are formed in the outer peripheral surface of the rectilinear barrel 11 along the optical axis OP direction, and are formed near the end on the subject side and near the end on the image plane side in the optical axis OP direction, respectively.

Consequently, the positions where the spacers 11ga and 11gb are mounted can be accurately positioned. Also, the depth of the recesses 11fa and 11fb ensures room for the thickness of the spacers 11ga and 11gb mounted therein, and makes it easier to mold the spacers 11ga and 11gb.

Also, the recesses 11fa and 11fb are wider in the direction perpendicular to the optical axis OP direction than the spacers 11ga and 11gb to be mounted.

Consequently, even if there should be seepage next to the spacers 11ga and 11gb when the spacers 11ga and 11gb have been mounted with an adhesive agent, these recessed portions can be utilized as an adhesive collector.

As shown in FIG. 5, the spacers 11ga and 11gb are attached with an adhesive, for example, in the recesses 11fa and 11fb formed on the outer peripheral surface of the main body portion 11a of the rectilinear barrel 11. The spacers 11ga and 11gb, together with the other spacers 11ha, 11hb, 11ia, and 11ib, are disposed at intervals of approximately 120 degrees so as to support the inner peripheral surface of the main body portion 12a of the main body portion 12a of the cam barrel 12 at three points when viewed from the optical axis OP direction (see FIG. 9).

Figure 7A:
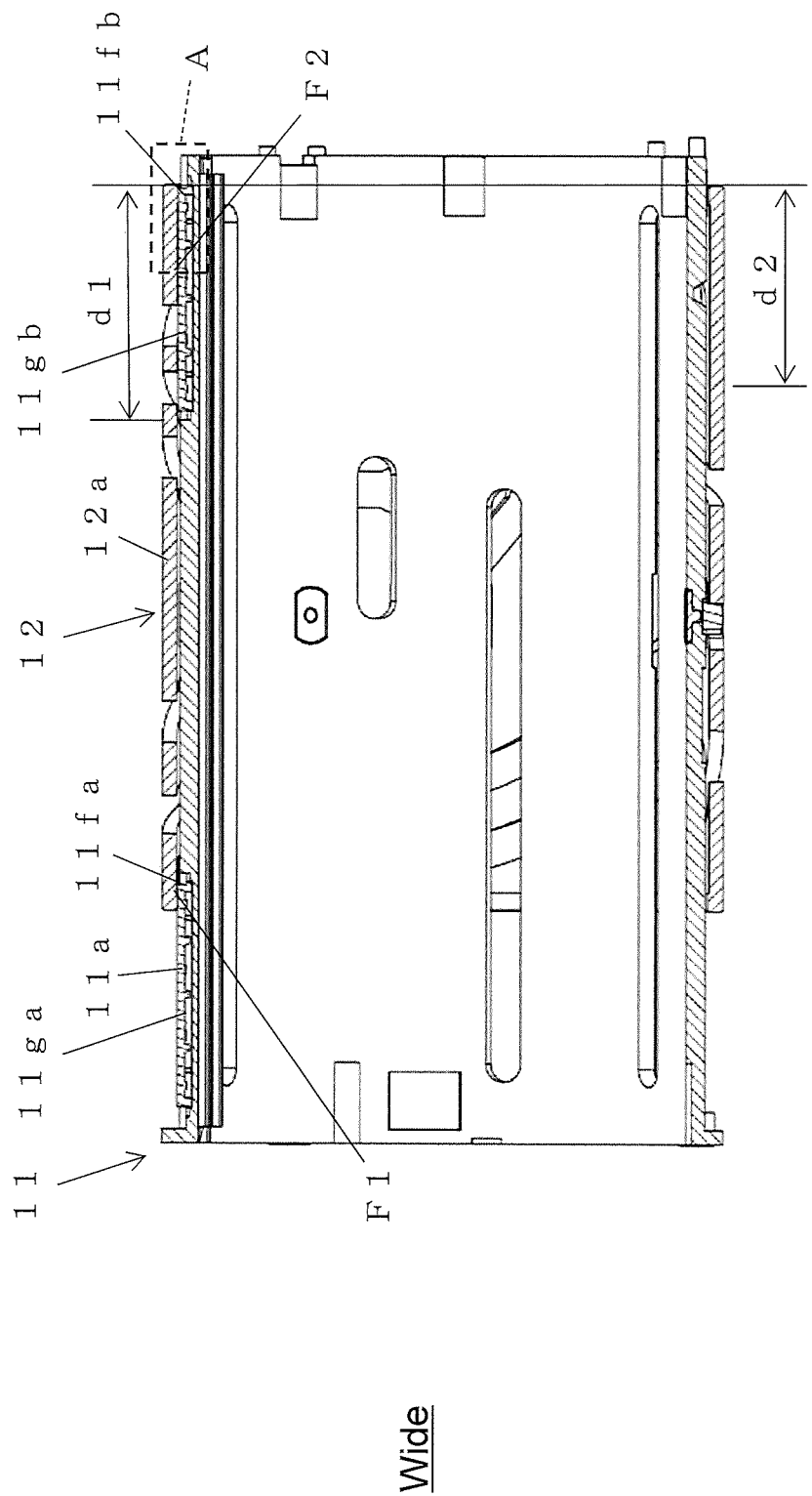
FIG. 7A is a side view showing the positional relationship between the spacer and the sliding surface in a state in which the rectilinear barrel in FIG. 5 and the cam barrel disposed on the outer peripheral surface side thereof are in the wide-angle position.
Figure 7B:
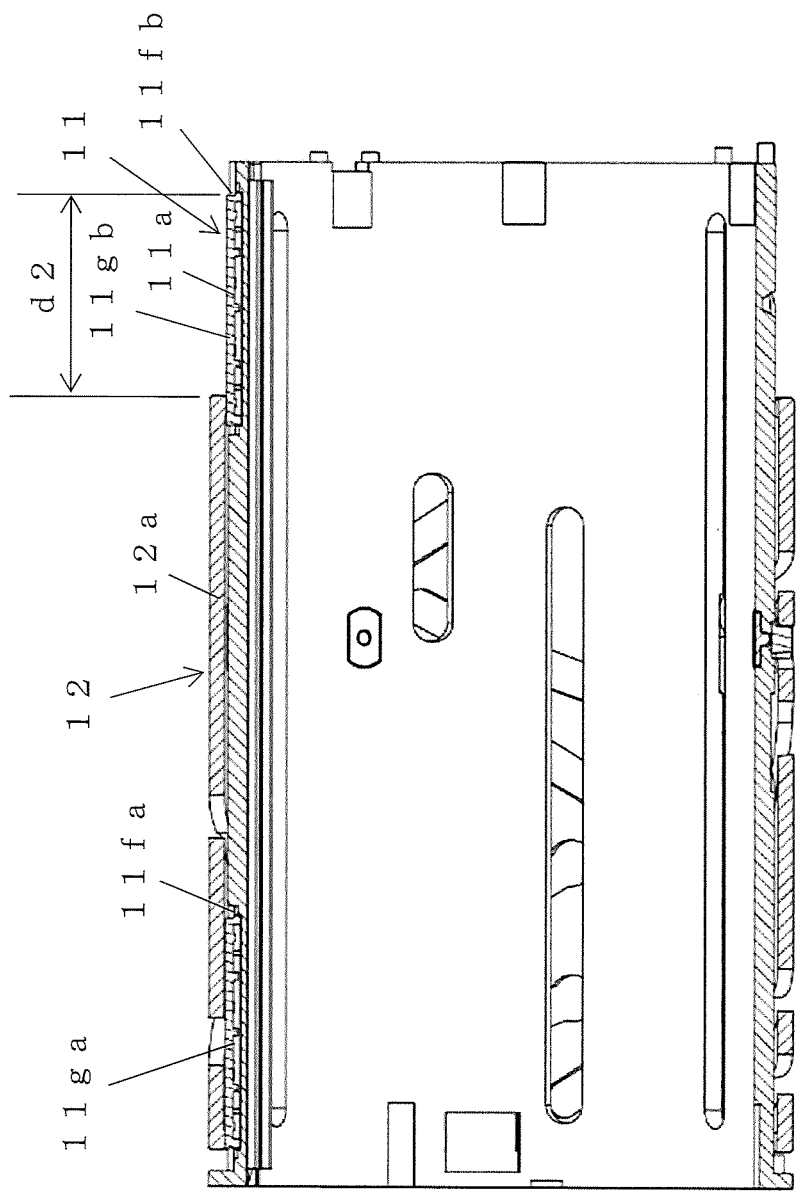
FIG. 7B is a side view showing the positional relationship between the spacer and the sliding surface in a state in which the rectilinear barrel in FIG. 5 and the cam barrel disposed on the outer peripheral surface side thereof are in the telephoto position.

Also, as shown in FIGS. 7A and 7B, the spacers 11ga and 11gb have a length d1 that is greater than the length d2 of the maximum amount of movement (deployment) of the cam barrel 12 with respect to the rectilinear barrel 11 in the optical axis OP direction.

Consequently, when the cam barrel 12 moves from the wide-angle position shown in FIG. 6A to the telephoto position shown in FIG. 6B, the inner peripheral surface of the main body portion 12a of the cam barrel 12 is prevented from falling off the spacers 11ga and 11gb that support at three points.

Furthermore, the spacers 11ga and 11gb have a substantially rounded shape in a cross-sectional view in which the upper end surface that slides in contact with the inner peripheral surface of the main body portion 12a of the cam barrel 12 is perpendicular to the optical axis OP direction.

Also, the substantially rounded shape of the contact surface of the spacers 11ga and 11gb is formed so that its curvature is less than the curvature of the sliding surface on the inner peripheral surface side of the main body portion 12a of the cam barrel 12.

Consequently, even when the cam barrel 12 moves back and forth in the optical axis OP direction while rotating in the circumferential direction with respect to the outer peripheral surface of the rectilinear barrel 11, the contact surfaces of the spacers 11ga and 11gb, which support the inner peripheral surface of the main body portion 12a of the cam barrel 12 at three points, can be smoothly rotated and moved without catching.

The gap formed between the outer peripheral surface of the rectilinear barrel 11 and the inner peripheral surface of the main body portion 12a of the cam barrel 12, which causes looseness, will vary from one product to the next due to dimensional variance during molding. Therefore, it is preferable to prepare a plurality of spacers 11ga and 11gb having different sizes (heights) so that spacers 11ga and 11gb having the appropriate size (height) can be selected to match this variance.

The spacers 11ha, 11hb, 11ia, and 11ib are convex portions formed integrally with the main body portion 11a of the rectilinear barrel 11, and are formed so as to protrude outward in the radial direction. The spacers 11ha and 11hb are disposed at positions of approximately 120 degrees in the clockwise direction with respect to the spacers 11ga and 11gb when viewed from the subject side in the optical axis OP direction (see FIG. 9). The spacers 11ia and 11ib are disposed at positions of approximately 120 degrees in the counterclockwise direction with respect to the spacers 11ga and 11gb when viewed from the subject side in the optical axis OP direction (see FIG. 9).

Also, the spacers 11ha, 11hb, 11ia, and 11ib are similar to the spacers 11ga and 11gb in that they have a length d1 that is greater than the length d2 of the maximum amount of movement of the cam barrel 12 with respect to the rectilinear barrel 11 in the optical axis OP direction, as shown in FIGS. 7A and 7B.

Consequently, when the cam barrel 12 moves from the wide-angle position shown in FIG. 6A to the telephoto position shown in FIG. 6B, the inner peripheral surface of the main body portion 12a of the cam barrel 12 can be prevented from falling off the spacers 11ha, 11hb, 11ia, and 11ib that support at three points.

Furthermore, the spacers 11ha, 11hb, 11ia, and 11ib are similar to the spacers 11ga and 11gb in that the upper end surface that slides in contact with the inner peripheral surface of the main body portion 12a of the cam barrel 12 has a substantially rounded shape in a cross-sectional view perpendicular to the optical axis OP direction.

Also, the substantially rounded shape of the contact surface of the spacers 11ha, 11hb, 11ia, and 11ib is formed so that its curvature is less than the curvature of the sliding surface on the inner peripheral surface side of the main body portion 12a of the cam barrel 12.

Consequently, even when the cam barrel 12 moves back and forth in the optical axis OP direction while rotating in the circumferential direction with respect to the outer peripheral surface of the rectilinear barrel 11, the contact surfaces of the spacers 11ha, 11hb, 11ia, and 11ib, which support the inner peripheral surface of the main body portion 12a of the cam barrel 12 at three points, can be smoothly rotated and moved without catching.

(2-2) Cam Barrel 12

As shown in FIGS. 6A and 6B, the cam barrel 12 is disposed on the outer peripheral surface side of the substantially cylindrical rectilinear barrel 11 described above, and has a substantially cylindrical main body portion 12a, main cam grooves 12b, a sub-cam follower 12c, and cam grooves 12d, 12e, 12f, and 12g.

With the lens barrel 100 in this embodiment, the rectilinear barrel 11 and the cam barrel 12 are inserted on the inner peripheral surface side of the base frame 40, and the rectilinear barrel 11 is fixed to the base frame 40 with screws (not shown).

Consequently, as shown in FIGS. 6A and 6B, the cam barrel 12 moves back and forth in the optical axis OP direction on the outer peripheral surface side of the rectilinear barrel 11 that is fixed with respect to the base frame 40.

As shown in FIG. 6A, the substantially cylindrical main body portion 12a is formed with a plurality of cam grooves including the main cam grooves 12b and the cam grooves 12d, 12e, 12f, and 12g.

As shown in FIGS. 6A and 6B, three main cam grooves 12b are provided near the approximate center of the substantially cylindrical main body portion 12a so as to correspond to the three main cam followers 11b provided on the rectilinear barrel 11 side (described above). The three main cam grooves 12b are provided as substantially linear through-holes formed at an angle to the optical axis OP direction.

The main cam grooves 12b do not have to be substantially linear, and may be formed along a free curve.

Consequently, when the cam barrel 12 is rotated with respect to the rectilinear barrel 11, the main cam followers 11b provided on the rectilinear barrel 11 side move along the main cam grooves 12b, causing the cam barrel 12 to move back and forth in the optical axis OP direction.

Also, as shown in FIG. 6A, the main cam grooves 12b are disposed at positions overlapping a part of the sub-cam groove 11c when viewed from the outer peripheral surface side.

The sub-cam follower 12c is provided so as to protrude inward in the radial direction from the inner peripheral surface of the main body portion 12a of the cam barrel 12. The sub-cam follower 12c is engaged with the sub-cam groove 11c provided on the rectilinear barrel 11 side (described above) with a specific gap therebetween.

In this embodiment, the sub-cam follower 12c is formed separately from the cam barrel 12, and then attached so as to be embedded in the inner peripheral surface of the main body portion 12a of the cam barrel 12, but the sub-cam follower 12c may instead be molded integrally with the cam barrel 12.

As shown in FIGS. 6A and 6B, the cam groove 12d is a through-hole formed in the cam barrel 12 at a position from the end portion on the subject side to near the approximate center, along a direction intersecting the optical axis OP direction, and the cam follower 21b of the first lens group unit 21 is engaged as shown in FIG. 2. The cam groove 12d is such that at the wide-angle position shown in FIG. 6A, the cam follower 21b of the first lens group unit 21 is located at the right end (image plane side), and at the telephoto position shown in FIG. 6B, the cam follower 21b is located at the left end (subject side).

Consequently, when the cam barrel 12 is rotated with respect to the rectilinear barrel 11, the cam follower 21b of the first lens group unit 21 moves along the cam groove 12d of the cam barrel 12 while engaged with the rectilinear groove 11d of the rectilinear barrel 11, which allows the first lens group unit 21 to be moved back and forth in the optical axis OP direction.

As shown in FIGS. 6A and 6B, the cam groove 12e is a through-hole formed in the cam barrel 12 near the end portion on the subject side, along a direction intersecting the optical axis OP direction, and the cam follower 23a of the third lens group unit 23 is engaged. The cam groove 12e is such that at the wide-angle position shown in FIG. 6A, the cam follower 23a of the third lens group unit 23 is located at the right end (image plane side), and at the telephoto position shown in FIG. 6B, the cam follower 23a of the third lens group unit 23 is located at the left end (subject side).

Consequently, when the cam barrel 12 is rotated with respect to the rectilinear barrel 11, the cam follower 23a of the third lens group unit 23 moves along the cam groove 12e while engaged with the rectilinear groove 11e of the rectilinear barrel 11, which allows the third lens group unit 23 to be moved back and forth in the optical axis OP direction.

As shown in FIGS. 6A and 6B, the cam groove 12f is a through-hole that is formed in the cam barrel 12, along a direction intersecting the optical axis OP direction, at a position adjacent to the cam groove 12e formed near the end portion on the subject side, and the cam follower 24a of the fourth lens group unit 24 is engaged. The cam groove 12f is such that at the wide-angle position shown in FIG. 6A, the cam follower 24a of the fourth lens group unit 24 is located at the right end (image plane side), and at the telephoto position shown in FIG. 6B, the cam follower 24a of the fourth lens group unit 24 is located at the left end (subject side).

Consequently, when the cam barrel 12 is rotated with respect to the rectilinear barrel 11, the cam follower 24a of the fourth lens group unit 24 moves along the cam groove 12f while engaged with the rectilinear groove 11e of the rectilinear barrel 11, which allows the lens group unit 24 to be moved back and forth in the optical axis OP direction.

As shown in FIGS. 6A and 6B, the cam groove 12g is a through-hole formed in the cam barrel 12 at a position near the end on the image plane side along a direction intersecting the optical axis OP direction, and the cam follower 27a of the seventh lens group unit 27 is engaged. The cam groove 12g is such that at the wide-angle position shown in FIG. 6A, the cam follower 27a of the seventh lens group unit 27 is located at the right end (image plane side), and at the telephoto position shown in FIG. 6B, the cam follower 27a of the seventh lens group unit 27 is located at the left end (subject side).

Consequently, when the cam barrel 12 is rotated with respect to the rectilinear barrel 11, the cam follower 27a of the seventh lens group unit 27 moves along the cam groove 12g while engaged with the rectilinear groove 11e of the rectilinear barrel 11, which allows the lens group unit 27 to be moved back and forth in the optical axis OP direction.

As shown in FIGS. 6A and 6B, a zoom drive pin 33 has already been attached to the outer peripheral surface of the cam barrel 12. However, in the actual assembly process, the zoom drive pin 33 is fixed to the outer peripheral surface of 12 by being inserted through a pin insertion hole 32b (discussed below) in a state in which the base frame 40 and the zoom ring 32 have been assembled on the outer peripheral surface side of the cam barrel 12.

Figure 8:
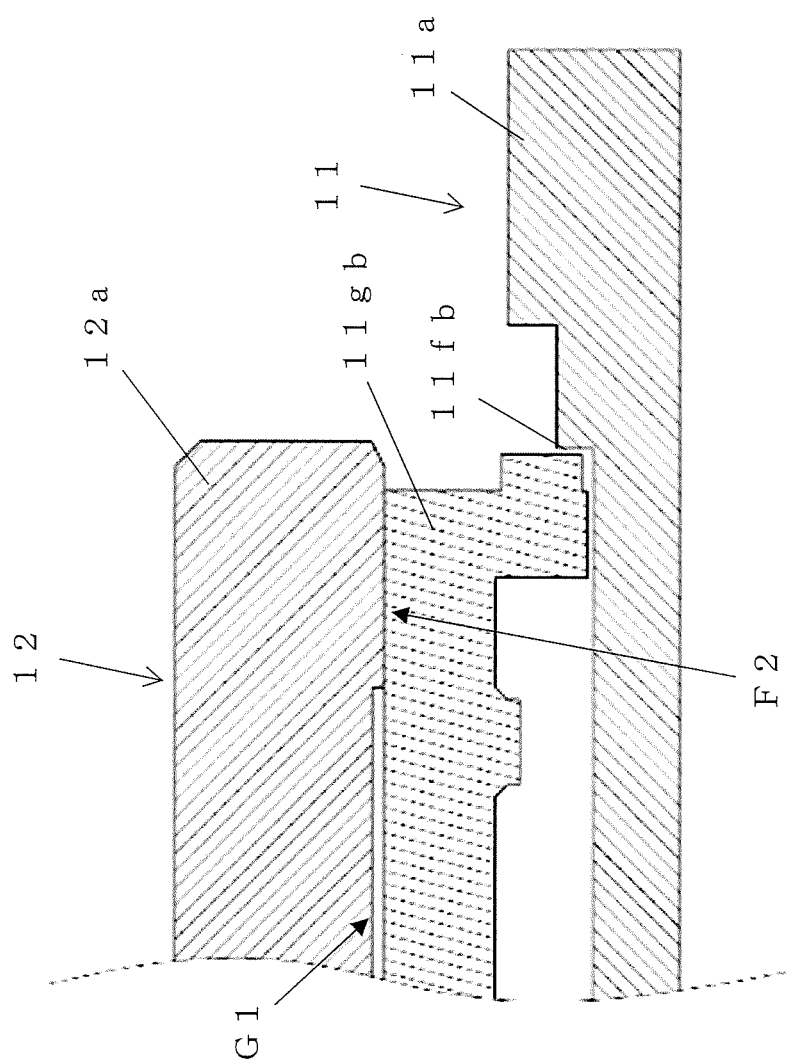
FIG. 8 is a detail view of the A portion in FIG. 7A.

Here, the cam barrel 12 is disposed on the outer peripheral side of the rectilinear barrel 11, and as shown in FIG. 7A, has sliding surfaces F1 and F2 that slide in a state in which spacers 11ga, 11gb, 11ha, 11hb, 11ia, and 11ib are in contact with the inner peripheral surface of the main body portion 12a. As shown in FIG. 8, the sliding surfaces F1 and F2 are smaller than the inside diameter of the portion other than the sliding surfaces F1 and F2.

FIG. 8 illustrates the sliding surface F2 of the spacer 11gb provided at the end on the image plane side in the optical axis OP direction, but the sliding surface F1 of the spacer 11g provided on the subject side is the same. The same applies to the other spacers 11ha, 11hb, 11ia, and 11ib.

That is, as shown in FIG. 8, the cam barrel 12 has the sliding surface F2 at the position where the entire upper end surface of the spacer 11gb does not come into contact with the spacer 11gb fixed to the recess 11fb, and only the part on the image plane side comes into contact.

Therefore, as shown in FIG. 8, a gap G1 is formed by a recess formed on the inner peripheral surface side of the main body portion 12a of the cam barrel 12, between the upper end surface of the spacer 11gb and the inner peripheral surface of the main body portion 12a of the cam barrel 12.

Consequently, the sliding surface is limited to a part of the spacer 11gb, which reduces the rotational torque of the cam barrel 12 with respect to the rectilinear barrel 11, and allows the cam barrel 12 to be smoothly rotated.

Also, the cam barrel 12 has a sliding surface F1 (first sliding surface) on the subject side (first end side) in the optical axis OP direction on the inner peripheral surface side thereof, and has a sliding surface F2 (second sliding surface) on the image plane side (second end side). Within the range in which the cam barrel 12 moves in the optical axis OP direction, the spacer 11ga is always in contact with the sliding surface F1, and the spacer 11gb is always in contact with the sliding surface F2.

Consequently, the spacers 11ga, 11gb, 11ha, 11hb, 11ia, and 11ib are always in contact with the sliding surfaces F1 and F2 provided on the inner peripheral surface of the main body portion 12a of the cam barrel 12, so the inner peripheral surface of the main body portion 12a of the cam barrel 12 is supported at three points on the sliding surfaces F1 and F2 by the spacers 11ga, 11gb, 11ha, 11hb, 11ia, and 11ib.

Three-Point Support Structure of Cam Barrel with Spacers

Figure 9:
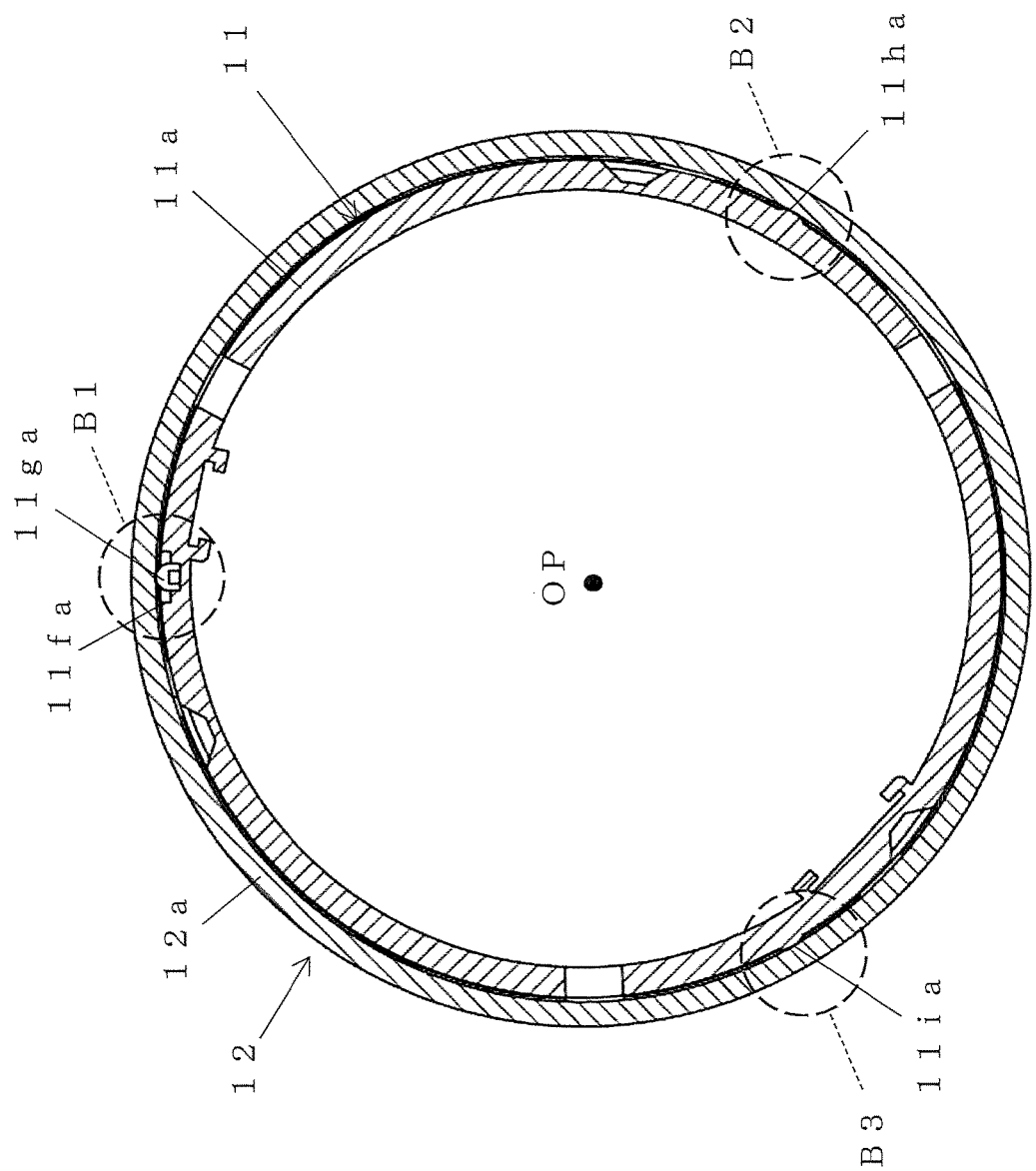
FIG. 9 is a front view as seen from the subject side in the optical axis direction, showing a state in which the rectilinear barrel in FIG. 5 and the cam barrel disposed on the outer peripheral surface side thereof are supported at three points by a spacer.

With the lens barrel 100 in this embodiment, as shown in FIG. 9, the spacers 11ga, 11gb, 11ha, 11hb, 11ia, and 11ib provided on the outer peripheral surface of the main body portion 11a of the rectilinear barrel 11 are used to support the inner peripheral surface of the main body portion 12a of the cam barrel 12 at three points in a state in which rotational movement is possible.

In FIG. 9 the view from the subject side in the optical axis OP direction, so only the spacers 11ga, 11ha, and 11ia are shown, but the same applies to the spacers 11gb, 11hb, and 11ib disposed on the image plane side.

That is, as described above, the spacers 11ga and 11gb, the spacers 11ha and 11hb, and the spacers 11ia and 11ib are disposed on the outer peripheral surface of the main body portion 11a of the rectilinear barrel 11 at intervals of approximately 120 degrees, and support the inner peripheral surface of the main body portion 12a of the cam barrel 12 at three points.

Figures 10A, 10B, 10C:
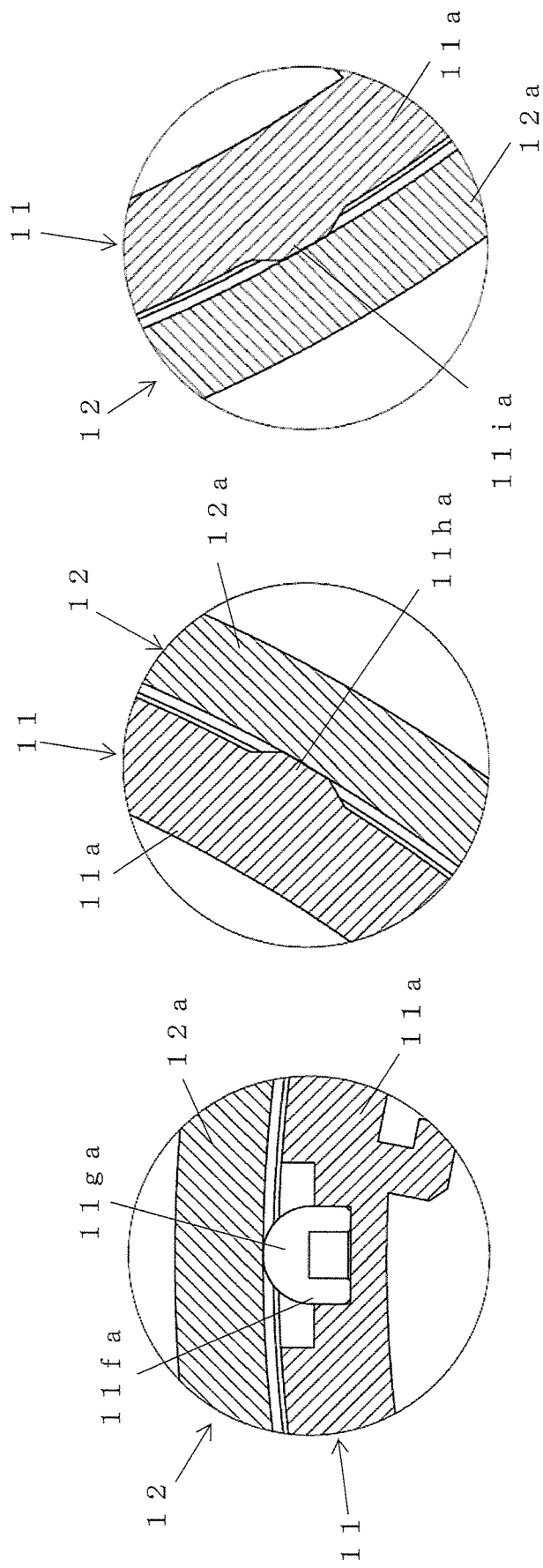
FIG. 10A is a detail view of the B1 portion in FIG. 9.
FIG. 10B is a detail view of the B2 portion in FIG. 9.
FIG. 10C is a detail view of the B3 portion in FIG. 9.
Figure 11:
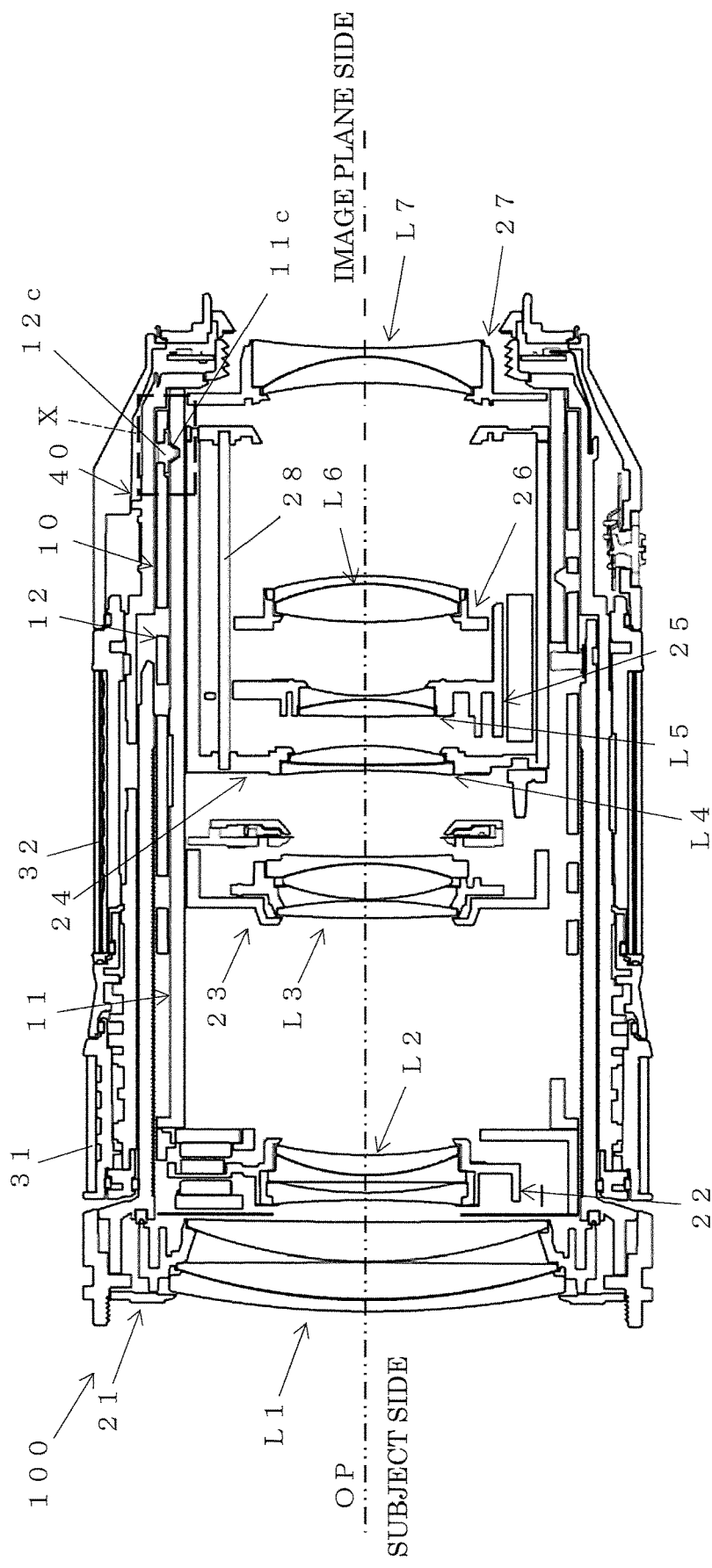
FIG. 11 is a cross-sectional view showing a state in which a sub-cam follower provided to a cam barrel is engaged in a sub-cam groove provided to the rectilinear barrel with a specific gap therebetween.

As described above, the spacer 11ga is fixed by an adhesive to the recess 11fa formed in the outer peripheral surface of the main body portion 11a of the rectilinear barrel 11 as shown in FIG. 10A. The spacer 11ga protrudes outward in the radial direction from the outer peripheral surface of the main body portion 11a of the rectilinear barrel 11, and at the rounded portion of the upper end surface, supports the inner peripheral surface of the main body portion 12a of the cam barrel 12, in a state of being in constant contact with the inner peripheral surface of the main body portion 12a of the cam barrel 12.

As described above, the spacer 11ha is molded integrally with the main body portion 11a of the rectilinear barrel 11, as shown in FIG. 10B. The spacer 11ga protrudes outward in the radial direction from the outer peripheral surface of the main body portion 11a of the rectilinear barrel 11, and at the rounded portion of the upper end surface thereof, supports the inner peripheral surface of the main body portion 12a of the cam barrel 12 in a state of being in constant contact with the inner peripheral surface of the main body portion 12a of the cam barrel 12.

As described above, the spacer 11ia is molded integrally with the main body portion 11a of the rectilinear barrel 11, as shown in FIG. 10C. The spacer 11ga protrudes outward in the radial direction from the outer peripheral surface of the main body portion 11a of the rectilinear barrel 11, and at the rounded portion of the upper end surface thereof, supports the inner peripheral surface of the main body portion 12a of the cam barrel 12 in a state of being in constant contact with the inner peripheral surface of the main body portion 12a of the cam barrel 12.

Consequently, the three spacers 11ga, 11ha, and 11ia can support the inner peripheral surface of the main body portion 12a of the cam barrel 12 at three points at their end portion on the subject side in the optical axis OP direction.

Similarly, the three spacers 11gb, 11hb, and 11ib can support the inner peripheral surface of the main body portion 12a of the cam barrel 12 at three points at their end portion on the image plane side in the optical axis OP direction.

Assembly of Lens Barrel 100

The process of assembling the lens barrel 100 including the lens support mechanism 10 in this embodiment will now be described with reference to FIGS. 12A to 15B.

Specifically, as described above, the rectilinear barrel 11 and the cam barrel 12 are mated in the radial direction of a circle centered on the optical axis OP, with the cam barrel 12 disposed on the outer peripheral surface side of the rectilinear barrel 11.

First, the main cam followers 11b of the rectilinear barrel 11 are fixed with screws (not shown) on the outer peripheral surface of the rectilinear barrel 11, from the outside in the radial direction, as shown in FIG. 6A, in a state in which the cam barrel 12 has been inserted on the outer peripheral surface side of the rectilinear barrel 11.

Similarly, the cam followers 23a, 24a, and 27a of the third, fourth, and seventh lens group units 23, 24, and 27 are fixed with screws (not shown) from the outside in the radial direction, to the main body, etc., of the third, fourth, and seventh lens group units 23, 24, and 27 in a state in which the cam barrel 12 has been inserted on the outer peripheral surface side of the rectilinear barrel 11.

At this point, if the cam barrel 12 is rotated with respect to the rectilinear barrel 11, rotation of the first, third, fourth, and seventh lens group units 21, 23, 24, and 27 is restricted by the rectilinear grooves 11d and 11e, so these units move along the path of the cam grooves 12d, 12e, 12f, 12g in the optical axis OP direction.

Then, the cam barrel 12 itself also moves in the optical axis OP direction while rotating along the path of the main cam grooves 12b with which the main cam followers 11b on the rectilinear barrel 11 side are engaged.

Thus, with this configuration in which the cam barrel 12 is deployed with respect to the rectilinear barrel 11 shown in FIGS. 6A and 6B, the combined amount of movement of the first and the third to seventh lens group units 21 to 27 matches the combined value of the length of the path of cam grooves 12d, 12e, 12f, and 12g in the optical axis OP direction and the length of the path of the main cam grooves 12b in the optical axis OP direction.

Figure 12A:
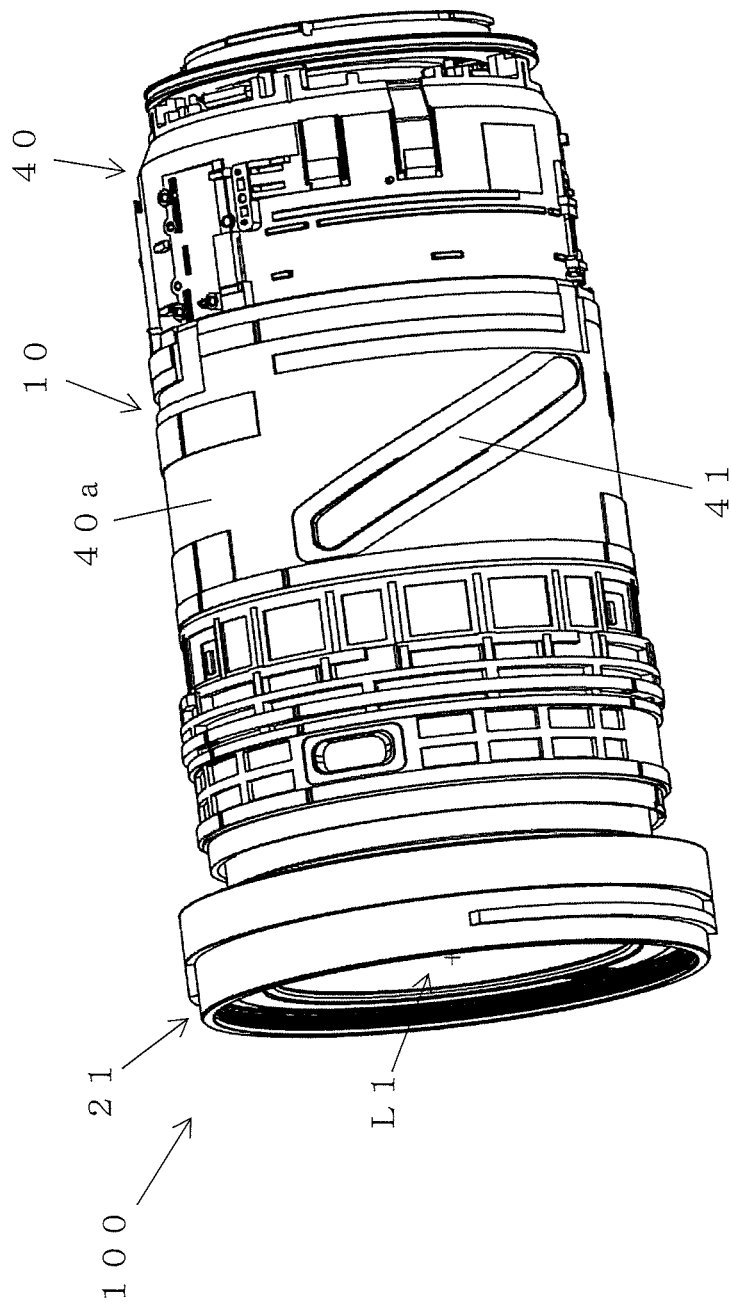
FIG. 12A is an oblique view showing a configuration in which the first lens group unit and a base frame are disposed on the outer peripheral surface side of the cam barrel in FIG. 6A.

Next, the rectilinear barrel 11 and the cam barrel 12 are inserted into the base frame 40 as shown in FIG. 12A in a state in which the first to seventh lens group units 21 to 27 have been assembled, and the rectilinear barrel 11 is fixed to the base frame 40 with screws (not shown).

Figure 12B:
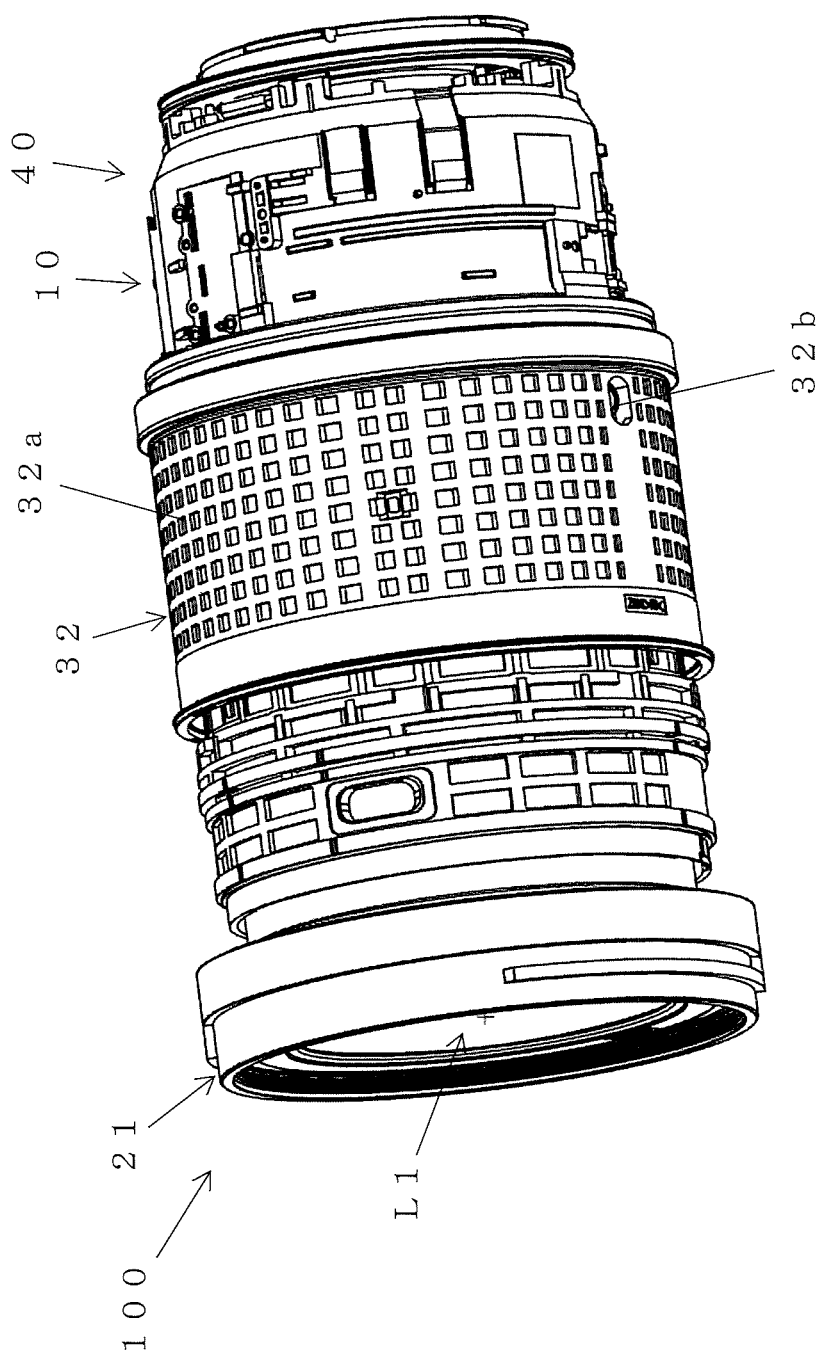
FIG. 12B is an oblique view showing a configuration in which a zoom ring is disposed on the outer peripheral surface side of the configuration in FIG. 12A.

Next, as shown in FIG. 12B, the substantially cylindrical zoom ring 32 is inserted into the outer peripheral surface side of the main body portion 40a of the substantially cylindrical base frame 40.

Figure 13:
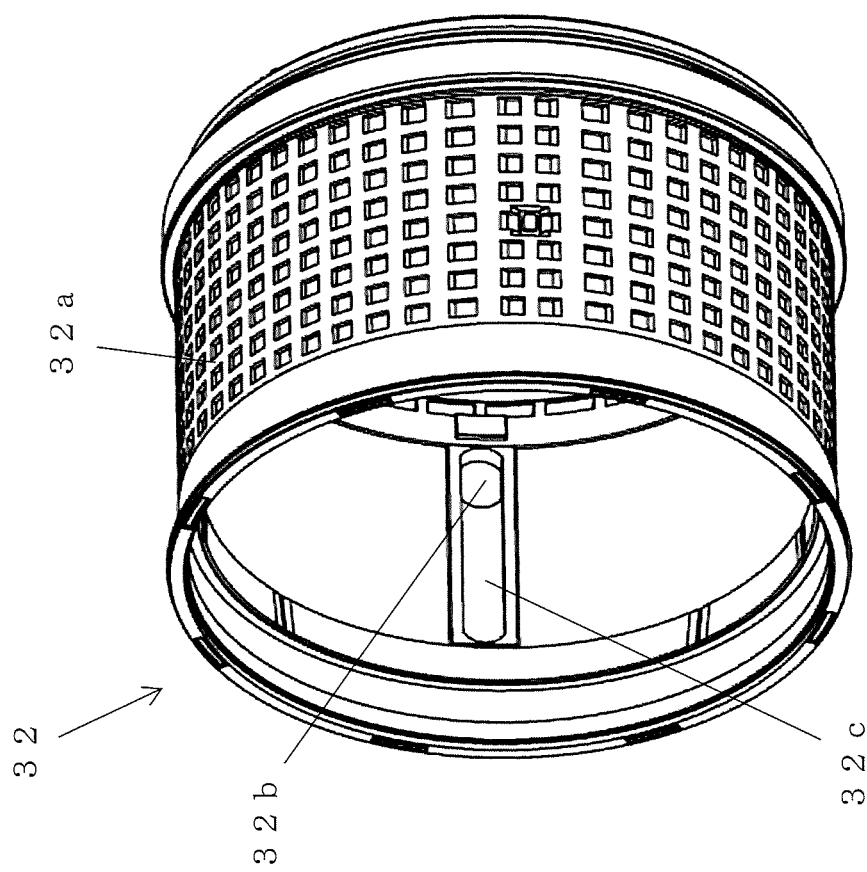
FIG. 13 is an oblique view showing the configuration of the zoom ring in FIG. 12B.

As shown in FIG. 13, the zoom ring 32 has a substantially cylindrical main body portion 32a, a pin insertion hole 32b, and a rectilinear restricting groove 32c.

The pin insertion hole 32b is a through-hole formed in the main body portion 32a, and the zoom drive pin 33 is inserted therein in the course of attaching the zoom drive pin 33 to the outer peripheral surface of the cam barrel 12.

The rectilinear restricting groove 32c is formed along the optical axis OP direction in order for the head of the zoom drive pin 33, which is inserted through the pin insertion hole 32b and is attached to the outer peripheral surface of the cam barrel 12 via a pin escape hole 41 (see FIG. 12A) of the base frame 40, to move while engaged.

Figure 14:
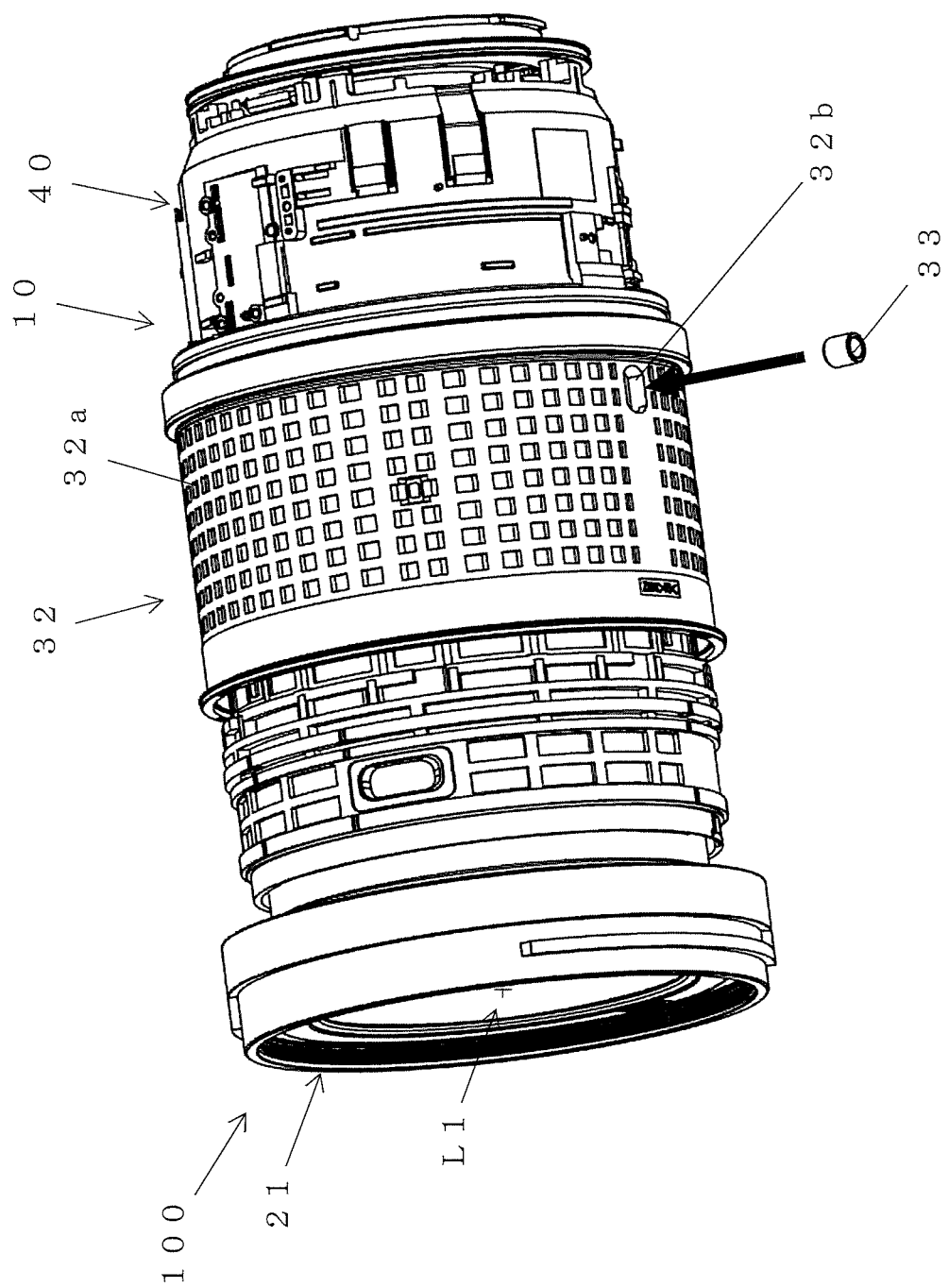
FIG. 14 is an oblique view showing a step of attaching a zoom drive pin to the zoom ring in FIG. 13 from the outer peripheral surface side thereof.

As shown in FIG. 14, the zoom drive pin 33 is inserted from the outer peripheral surface side through the pin insertion hole 32b of the zoom ring 32 and the pin escape hole 41 (see FIG. 12A) of the base frame 40. The zoom drive pin 33 is fixed with a screw (not shown) to the outer peripheral surface of the cam barrel 12 from the outer peripheral surface side.

Figure 15A:
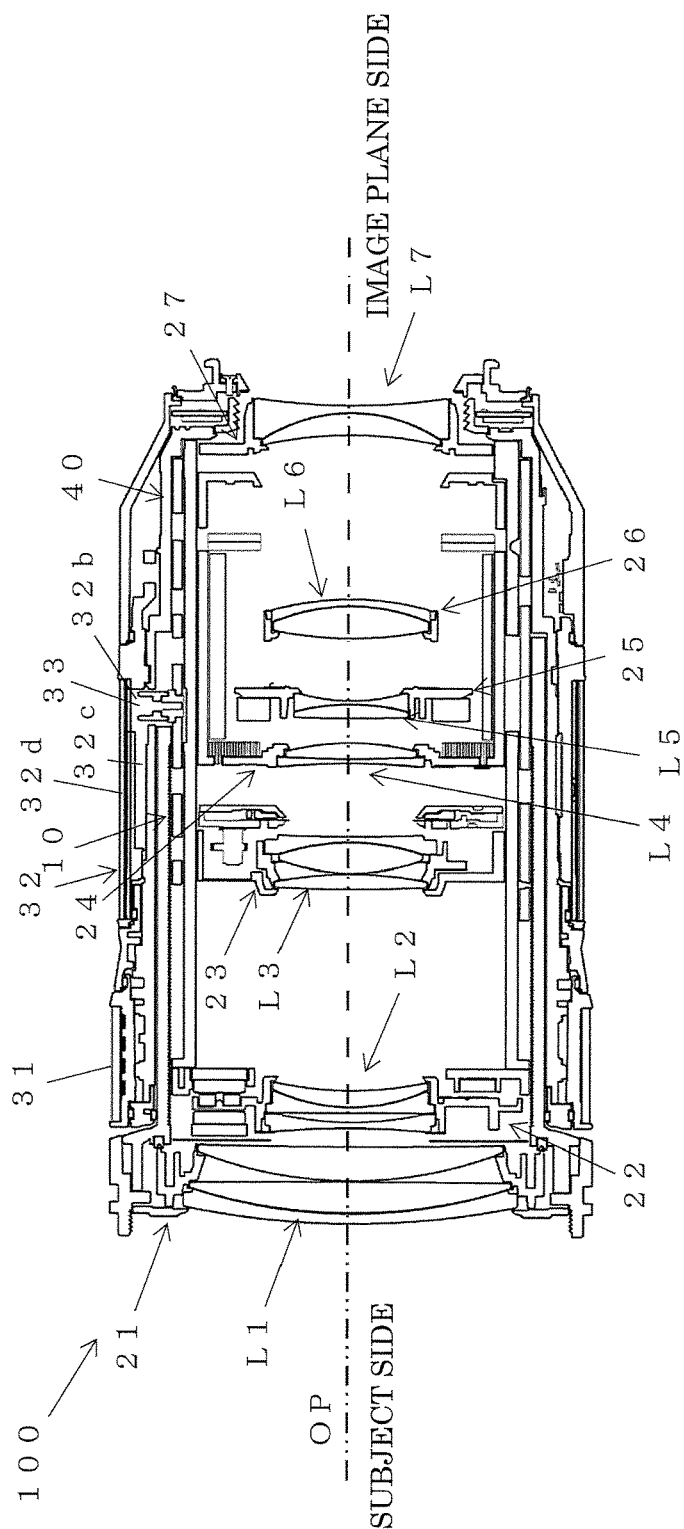
FIG. 15A is a cross-sectional view showing a configuration in which the zoom drive pin in FIG. 14 has moved to the wide-angle position in a state of being fixed to the cam barrel.
Figure 15B:
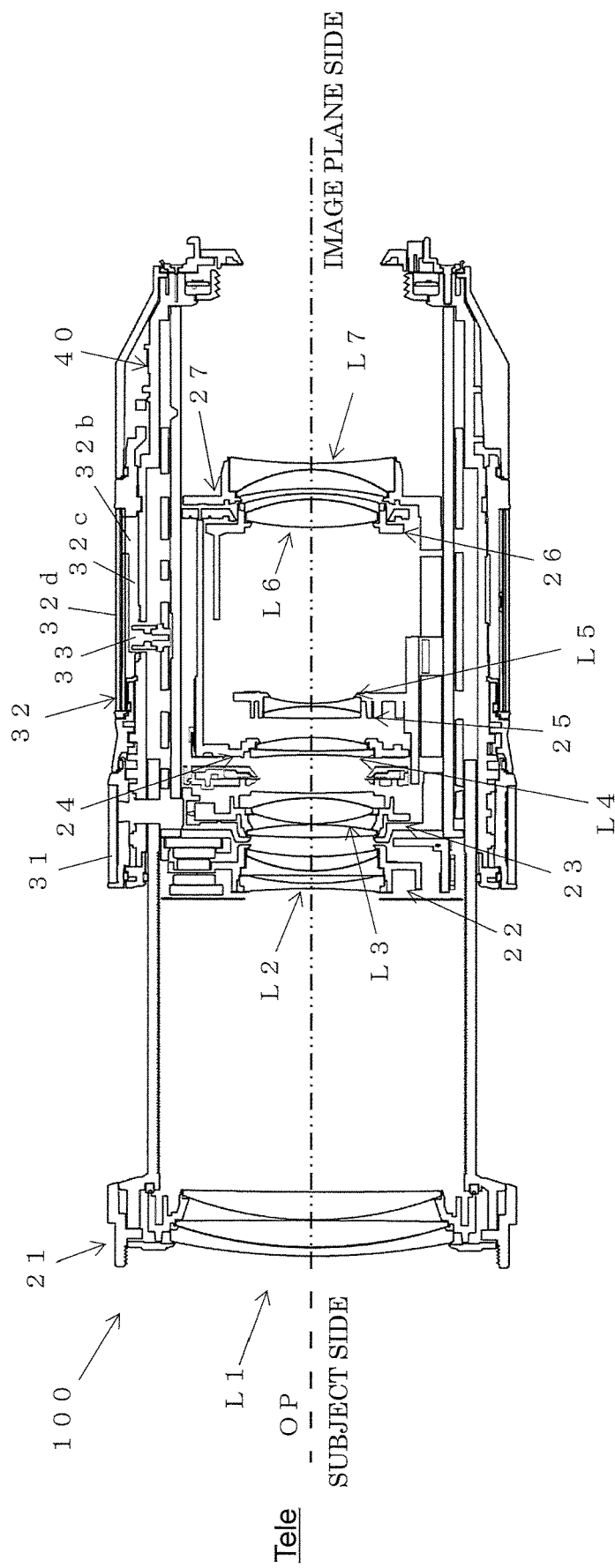
FIG. 15B is a cross-sectional view showing a configuration in which the zoom drive pin in FIG. 14 has moved to the telephoto position in a state of being fixed to the cam barrel.

At this point, as shown in FIGS. 15A and 15B, the head of the zoom drive pin 33 engages with the rectilinear restricting groove 32c and is supported so as to be movable in the optical axis OP direction relative to the zoom ring 32.

Here, when the zoom ring 32 is rotated, the cam barrel 12 is rotationally driven by applying a rotational force in the circumferential direction to the zoom drive pin 33 engaged with the zoom ring 32.

Then, the cam barrel 12 moves in the optical axis OP direction while rotating as the main cam followers 11b provided on the rectilinear barrel 11 side move along the main cam grooves 12b.

At this point, the zoom drive pin 33 slides in the optical axis OP direction while engaged with the rectilinear restricting groove 32c.

After the zoom drive pin 33 is fixed to the outer peripheral surface of the cam barrel 12 with a screw, a zoom ring rubber 32d is attached to the outer peripheral surface of the zoom ring 32 as shown in FIGS. 15A and 15B.

Consequently, the pin insertion hole 32b can be closed up so that the zoom drive pin 33 is not visible from the outside.

Main Features

The lens barrel 100 in this embodiment comprises the first to seventh lens group units 21 to 27, the substantially cylindrical rectilinear barrel 11, the substantially cylindrical cam barrel 12, and the spacers 11ga, 11gb, 11ha, 11hb, 11ia, 11ib. The substantially cylindrical rectilinear barrel 11 holds the third to seventh lens group units 23 to 27 on the inner peripheral surface side, and has the main cam followers 11b protruding in the radial direction. The substantially cylindrical cam barrel 12 is disposed substantially coaxially with the rectilinear barrel 11, and has the main cam grooves 12b that are formed in a direction intersecting the optical axis OP direction in order to move the third to seventh lens group units 23 to 27 in the optical axis OP direction, and that engage with the main cam followers 11b, and the third to seventh lens group units are rotated relative to the rectilinear barrel 11 in a state in which the main cam followers 11b and the main cam grooves 12b are engaged with each other, thereby moving the third to seventh lens group units 23 to 27 in the optical axis OP direction. The spacers 11ga, 11gb, 11ha, 11hb, 11ia, and 11ib protrude in the radial direction from the rectilinear barrel 11 and hit the cam barrel 12 so as to suppress looseness in the radial direction between the rectilinear barrel 11 and the cam barrel 12, and the length of these spacers in the optical axis OP direction is equal to or greater than the amount of movement of the cam barrel 12 in the optical axis OP direction with respect to the rectilinear barrel 11.

Here, the spacers 11ga, 11gb, 11ha, 11hb, 11ia, and 11ib have a length d1 that is equal to or greater than the length d2 of the maximum amount of movement (deployment amount) of the cam barrel 12 with respect to the rectilinear barrel 11 in the optical axis OP direction, as shown in FIGS. 7A and 7B.

Consequently, when the cam barrel 12 moves from the wide-angle position shown in FIG. 6A to the telephoto position shown in FIG. 6B, the cam barrel 12 can be prevented from falling off the spacers 11ha, 11hb, 11ia, and 11ib, on which the inner peripheral surface of the main body portion 12a of the cam barrel 12 is supported at three points, and looseness caused by a gap formed between the rectilinear barrel 11 and the cam barrel 12 can be effectively suppressed without increasing the rotational torque of the cam barrel 12.

Other Embodiments

An embodiment of the present disclosure was described above, but the present disclosure is not limited to or by the above embodiment, and various modifications are possible without departing from the gist of the disclosure.

(A)

In the above embodiment, an example was given in which two spacers 11ga and 11gb divided in the front-rear direction along the optical axis OP direction were attached to the outer peripheral surface of the main body portion 11a of the rectilinear barrel 11 in a removable state. However, the present disclosure is not limited to this.

For example, the configuration may be such that one spacer is provided in the optical axis direction.

Also, spacers of appropriate sizes do not need to be removably mounted to match individual differences in the gap between the rectilinear barrel (fixed barrel) and the cam barrel, and all of the spacers may be integrally molded on the outer peripheral surface of the rectilinear barrel.

(B)

In the above embodiment, an example was given in which the spacers 11ga and 11gb, the spacers 11ha and 11hb, and the spacers 11ia and 11ib were disposed on the outer peripheral surface of the main body portion 11a of the rectilinear barrel 11 at intervals of about 120 degrees, respectively, and the inner peripheral surface of the main body portion 12a of the cam barrel 12 was supported at three points by the spacers 11ga and 11gb, etc. However, the present disclosure is not limited to this.

For example, the number of spacers is not limited to six, and may be less than six or more than six.

Also, the number of points at which the cam barrel is supported by the spacers is not limited to three, but three-point support is the basis, and the support points may be further increased.

(C)

In the above embodiment, an example was given in which of the spacers 11ga and 11gb, the spacers 11ha and 11hb, and the spacers 11ia and 11ib that support the inner peripheral surface of the main body portion 12a of the cam barrel 12 at three points on the outer peripheral surface side of the main body portion 11a of the rectilinear barrel 11, the spacers 11ga and 11gb were removable, while the other spacers 11ha, 11hb, 11ia and 11ib were integrally molded (fixed disposition) on the rectilinear barrel 11. However, the present disclosure is not limited to this.

For example, of the three spacers that provide three-point support, all three of them may be removable, or all three of them may be fixedly disposed.

Alternatively, of the three spacers that provide three-point support, two of them may be removable and one of them may be fixedly disposed.

(D)

In the above embodiment, an example was given in which the spacers 11ga and 11gb were disposed near the two ends of the outer peripheral surface of the main body portion 11a of the rectilinear barrel 11 on the subject side and the image plane side in the optical axis OP direction, respectively. However, the present disclosure is not limited to this.

For example, the positions where the spacers are disposed is not limited to near the two ends on the subject side and the image plane side in the optical axis OP direction of the outer peripheral surface of the main body portion 11a of the rectilinear barrel 11, and may be other positions.

(E)

In the above embodiment, an example was given in which the spacers 11ga and 11gb were fixed by an adhesive in the recesses 11fa and 11fb. However, the present disclosure is not limited to this.

For example, the configuration may be such that the spacers are fixed in the recesses by pressure fitting.

In this case, for example, even if it becomes necessary to replace a spacer because its size does not match the recess in which it is to be fixed, or a spacer is defective, or for some other reason, since the spacer is not fixed with an adhesive, it can be disengaged and easily replaced with the right spacer.

(F)

In the above embodiment, an example was given in which the spacers 11ga and 11gb were mounted in the recesses 11fa and 11fb formed in the outer peripheral surface of the main body portion 11a of the rectilinear barrel 11. However, the present disclosure is not limited to this.

For example, the spacers may be mounted on the outer peripheral surface of a rectilinear barrel in which no recesses have been formed.

(G)

In the above embodiment, an example was given in which the cam barrel 12 disposed on the outer peripheral side of the fixedly disposed rectilinear barrel 11 was driven back and forth in the optical axis OP direction relative to the rectilinear barrel 11. However, the present disclosure is not limited to this.

For example, the rectilinear barrel may be driven back and forth in the optical axis direction relative to the cam barrel.

(H)

In the above embodiment, an example was given in which the portions of the spacers 11ga and 11gb, the spacers 11ha and 11hb, and the spacers 11ia and 11b that slid over the inner peripheral surface of the main body portion 12a of the cam barrel 12 had a substantially rounded shape in cross-sectional view, and were smaller than the curvature of the sliding surface on the cam barrel 12 side. However, the present disclosure is not limited to this.

For example, the shape of the sliding portion of the spacers is not limited to a substantially rounded shape, and may be some other shape such as one in which a plurality of spheres are combined.

(I)

In the above embodiment, an example was given in which the present disclosure was applied to a lens barrel 100 that could be attached to and detached from a camera body 101. However, the present disclosure is not limited to this.

For example, the present disclosure may be applied to a lens barrel that is integrated with a camera body and is not removable, rather than to a removable lens barrel.

INDUSTRIAL APPLICABILITY

The lens barrel disclosed herein has the effect of effectively suppressing looseness caused by a gap formed between a fixed barrel and a cam barrel, without increasing the rotational torque of the cam barrel, and as such is widely applicable to various kinds of lens barrel in which a lens group is driven in the optical axis direction by rotating a cam barrel.

The invention claimed is:

1. A lens barrel, comprising:
    at least one lens group;
    a substantially cylindrical fixed barrel that holds the lens group on an inner peripheral surface side and has a cam barrel cam follower that protrudes in a radial direction;
    a substantially cylindrical cam barrel that is disposed substantially coaxially with the fixed barrel, has a cam groove that is formed along a direction intersecting an optical axis direction and engages with the cam barrel cam follower in order to move the lens group in the optical axis direction, and moves the lens groups in the optical axis direction by being rotated relative to the fixed barrel in a state in which the cam barrel cam follower and the cam groove are engaged with each other; and
    a spacer that protrudes in the radial direction from the fixed barrel and comes into contact with the cam barrel so as to suppress looseness in the radial direction between the fixed barrel and the cam barrel, a length of the spacer in the optical axis direction being equal to or greater than an amount of movement of the cam barrel in the optical axis direction with respect to the fixed barrel.

2. The lens barrel according to claim 1,
    wherein the cam barrel is disposed on an outer peripheral side of the fixed barrel, and has a sliding surface on its inner peripheral side over which the spacer slides in a state of contact, and
    the sliding surface is smaller than an inside diameter of a portion of the cam barrel other than the sliding surface.

3. The lens barrel according to claim 1,
    wherein the spacer includes a first spacer and a second spacer disposed one ahead of the other along the optical axis direction.

4. The lens barrel according to claim 3,
    wherein the first spacer is disposed near a first end portion of the fixed barrel on a subject side in the optical axis direction, and
    the second spacer is disposed near a second end portion of the fixed barrel on an image plane side in the optical axis direction, which is on an opposite side from the first end portion.

5. The lens barrel according to claim 4,
    wherein the cam barrel respectively has a first sliding surface on a side of the first end portion, and a second sliding surface on a side of the second end portion, on the inner peripheral surface side thereof, and
    the first spacer is always in contact with the first sliding surface, and the second spacer is always in contact with the second sliding surface, respectively, within a range in which the cam barrel moves in the optical axis direction.

6. The lens barrel according to claim 3,
wherein at least one of the first spacer and the second spacer have a length that is greater than a length of the maximum amount of movement of the cam barrel with respect to the rectilinear barrel in the optical axis direction.

7. The lens barrel according to claim 1,
wherein the fixed barrel has a recess in which the spacer is attached.

8. The lens barrel according to claim 7,
wherein the spacer is removably attached in the recess.

9. The lens barrel according to claim 8,
wherein the spacer includes a removable spacer that is removably attached in the recess and a fixed spacer that is molded integrally with the fixed barrel.

10. The lens barrel according to claim 1,
wherein the spacer has a substantially rounded shape on a surface that comes into contact with the cam barrel.

11. The lens barrel according to claim 1,
wherein the spacer is formed so that a curvature of a surface that comes into contact with the cam barrel is less than a curvature of the sliding surface.

12. The lens barrel according to claim 1,
wherein a plurality of the spacers are disposed at specific angular intervals in a circumferential direction around the optical axis.

13. The lens barrel according to claim 12,
wherein the spacers are provided on an outer peripheral surface of the fixed barrel at intervals of approximately 120 degrees, and support the inner peripheral surface of the cam barrel at three points.

14. A camera, comprising:
the lens barrel according to claim 1; and
a camera body to which the lens barrel is attached.

* * * * *